United States Patent [19]

Dunmead et al.

[11] Patent Number: 5,525,556
[45] Date of Patent: Jun. 11, 1996

[54] SILICON NITRIDE/SILICON CARBIDE COMPOSITE POWDERS

[75] Inventors: Stephen D. Dunmead; Alan W. Weimer; Daniel F. Carroll; Glenn A. Eisman; Gene A. Cochran; David W. Susnitzky; Donald R. Beaman; Kevin J. Nilsen, all of Midland, Mich.

[73] Assignee: The Dow Chemical Company, Midland, Mich.

[21] Appl. No.: 484,539

[22] Filed: Jun. 7, 1995

Related U.S. Application Data

[62] Division of Ser. No. 227,751, Apr. 14, 1994.

[51] Int. Cl.$^6$ ............... C04B 35/596; C04B 35/577
[52] U.S. Cl. ............... 501/92; 501/97; 423/344; 423/345; 423/409
[58] Field of Search ............... 423/344, 345, 423/409; 501/92, 97, 98

[56] References Cited

U.S. PATENT DOCUMENTS

| | | | |
|---|---|---|---|
| 3,394,991 | 7/1968 | Evans | 23/191 |
| 4,117,095 | 9/1978 | Komeya et al. | 423/344 |
| 4,122,152 | 10/1978 | Mori et al. | 423/344 |
| 4,284,432 | 9/1981 | Nishida et al. | 106/73.2 |
| 4,428,916 | 1/1984 | Komeya et al. | 423/344 |
| 4,514,370 | 4/1985 | Inoue et al. | 423/344 |
| 4,517,168 | 5/1985 | Kawahito et al. | 423/344 |
| 4,590,053 | 5/1986 | Hashimoto | 423/344 |
| 4,619,905 | 10/1986 | Natansohn et al. | 501/97 |
| 4,784,839 | 11/1988 | Bachelard et al. | 423/290 |
| 4,798,714 | 1/1989 | Schonfelder et al. | 423/344 |
| 4,883,776 | 12/1989 | Pyzik et al. | 501/10 |
| 4,888,142 | 12/1989 | Hayashi et al. | 264/65 |
| 4,919,689 | 4/1990 | Pyzik et al. | 51/309 |
| 4,986,972 | 1/1991 | Ishii et al. | 423/344 |
| 5,021,372 | 6/1991 | Pyzik et al. | 501/97 |
| 5,075,091 | 12/1991 | Schonfelder et al. | 423/344 |
| 5,091,347 | 2/1992 | Pyzik et al. | 501/95 |
| 5,098,449 | 3/1992 | Hwang et al. | 51/307 |
| 5,118,645 | 6/1992 | Pyzik et al. | 501/97 |
| 5,120,328 | 6/1992 | Pyzik | 51/309 |
| 5,134,097 | 7/1992 | Niihara et al. | 501/92 |
| 5,160,508 | 11/1992 | Pyzik et al. | 51/307 |
| 5,256,610 | 10/1993 | Bansal et al. | 501/97 |
| 5,308,561 | 5/1994 | Leimer et al. | 264/65 |
| 5,352,641 | 10/1994 | Matsui et al. | 501/97 |
| 5,384,292 | 1/1995 | Matsui et al. | 501/98 X |
| 5,424,256 | 6/1995 | Yoshimura et al. | 501/97 |

FOREIGN PATENT DOCUMENTS

| | | | |
|---|---|---|---|
| 1308231 | 10/1992 | Canada | 21/68 |
| 0206795 | 12/1986 | European Pat. Off. | 21/68 |
| 0400650 | 5/1990 | European Pat. Off. | 35/58 |
| 0552381 | 12/1992 | European Pat. Off. | 35/58 |
| 557163 | 8/1993 | European Pat. Off. | 21/68 |
| 048373 | 11/1978 | Japan | 21/6 |
| 53-137899 | 12/1978 | Japan | 21/6 |
| 55-15946 | 2/1980 | Japan | 21/6 |
| 56-022611 | 3/1981 | Japan | 21/6 |
| 56-092109 | 7/1981 | Japan | 21/6 |
| 57-106511 | 2/1982 | Japan | 21/6 |
| 58-091011 | 5/1983 | Japan . | |
| 58-091007 | 5/1983 | Japan | 21/6 |
| 58-091006 | 5/1983 | Japan | 21/6 |
| 58-104006 | 6/1983 | Japan | 21/68 |
| 58-199707 | 11/1983 | Japan | 21/6 |
| 58-217469 | 12/1983 | Japan | 35/58 |
| 59-039704 | 3/1984 | Japan | 21/6 |
| 59-097508 | 6/1984 | Japan | 21/6 |
| 59-107976 | 6/1984 | Japan | 35/58 |
| 61-242905 | 10/1986 | Japan | 21/6 |
| 62-260704 | 11/1987 | Japan | 21/6 |
| 63-162515 | 7/1988 | Japan | 21/6 |
| 63-162516 | 7/1988 | Japan | 21/6 |
| 63-162513 | 7/1988 | Japan | 21/6 |
| 63-162511 | 7/1988 | Japan | 21/6 |
| 63-176301 | 7/1988 | Japan | 21/68 |
| 63-239104 | 10/1988 | Japan | 21/68 |
| 01226706 | 9/1989 | Japan | 21/6 |
| 04209705 | 11/1990 | Japan | 21/68 |
| 03232707 | 10/1991 | Japan | 21/6 |
| 03237008 | 10/1991 | Japan | 35/58 |
| 4130063 | 5/1992 | Japan | 35/58 |
| 04294903 | 10/1992 | Japan | 27/14 |
| 5809 | 1/1993 | Japan | 21/68 |
| 524926 | 2/1993 | Japan | 35/58 |
| 524924 | 2/1993 | Japan | 35/58 |
| 1528160 | 10/1978 | United Kingdom . | |
| 9304012 | 3/1993 | WIPO | 35/58 |

OTHER PUBLICATIONS

T. Licko et al., "Synthesis of Silicon Nitride by Carbothermal Reduction and Nitriding of Silica: Control of Kinetics and Morphology", Journal of the European Ceramic Society 9 (1992), 219–30.

V. Figusch et al., "Synthesis of Silicon Nitride Powder by Carbothermal Nitriding of Silica", *High Tech Ceramics* (edited by P. Vincenzini), (1987) pp. 517–526.

H. Inoue et al., "Synthesis of Silicon Nitride Powder from Silica Reduction", *Communications of the American Ceramic Society*, Dec. 1982, p. C–205.

Shi-Chang Zhang et al., in "Preparation of Silicon Nitride from Silica", *J. Am. Ceram. Soc.*, vol. 67, No. 10, (Oct. 1984), pp. 691–695.

M. Ekelund et al., "Reactions Within Quartz-Carbon Mixtures in a Nitrogen Atmosphere", J. European Ceram. Soc., 9 (1992), pp. 107–119–107.

A. Hendry et al., in "The Preparation of Silicon Nitride from Silica", *Special Ceramics 6, British Ceram. R.A.*, pp. 199–209 (1975).

(List continued on next page.)

*Primary Examiner*—Karl Group

[57] ABSTRACT

Prepare silicon nitride-silicon carbide composite powders by carbothermal reduction of crystalline silica powder, carbon powder and, optionally, crystalline silicon nitride powder. The crystalline silicon carbide portion of the composite powders has a mean number diameter less than about 700 nanometers and contains nitrogen. The composite powders may be used to prepare sintered ceramic bodies and self-reinforced silicon nitride ceramic bodies.

4 Claims, No Drawings

OTHER PUBLICATIONS

Cho et al., "Synthesis of Nitrogen Ceramic Powders by Carbothermal Reduction and Nitridation, Part 1 Silicon Nitride", *Materials Science and Technology*, vol. 7 (Apr. 1991), pp. 289–297.

S. J. P. Durham et al., "Silicon Nitride Particle Formation During Carbothermal Reduction", *Ceram Powd Proc Sci. Proc. Int. Conf. 2nd* (1989), 313–325.

F. K. van Dijen et al., "A Comparative Study of Three Silicon Nitride Powders, Obtained by Three Different Syntheses", *Key Engineering Materials*, vol. 89–91, pp. 19–28 (1994).

F. Cambier et al., "Silicon Nitride: Relations Between Powder Characteristics and Sinterability" *The Physics and Chemistry of Carbides; Nitrides and Borides*, 13–28 (1990).

W. H. Rhodes et al., "Powders for Advanced Structural Ceramics", *Ceramic Bulletin*, vol. 68, No. 10, (1989), pp. 1804–1812.

G. Schwier, "On the Preparation of Fine Silicon Nitride Powders", *Progress in Nitrogen Ceramics*, pp. 157–166 (1983) (F. L. Riley, editor).

P. Whitman et al., "Comparison of Surface Charge Behavior of Commercial Silicon Nitride and Silicon Carbide Powders", *J. Am. Ceram. Soc.*, 71[12], 1086–93 (1988).

T. Yamada, *American Ceramic Society Bulletin*, "Preparation and Evaluation of Sinterable Silicon Nitride Powder by Imide Decomposition Method", 7(5) 5 May 1993, p. 99–106.

Niihara, K. et al., 'Structural Ceramic Nanocomposites by Sintering Method Roles of Nano–Size Particles', Osaka University, pp. 404–417.

Sasaki, H., 'Mechanical Properties & Microstructure of $Si_3N_4$ Matrix Composite with Nano–meter Scale SiC Particles', *J. Am Ceram Soc.* 100[4] 536–540 (1992).

Niihara, K. et al., "Strengthening of Oxide Ceramics By SiC and $Si_3N_4$ Dispersions", *Ceramic Materials & Components for Engines*, pp. 919–926.

Dongliang, J. et al. "SiC–$Si_3N_4$ Gradient Composite Ceramics by Special HIP Processing", pp. 416–423.

Brunauer, S. et al., "Adsorption of Gases in Multimolecular Layers", *J. Am Chem Soc.*, 60(309) 1938 pp. 309–319.

Nagai, A. et al., "Synthetic Raw Materials for Ceramics", *Silicon Nitride* 93, pp. 27–28.

Akimune, Y. et al., "Influence of Starting Powder Characteristics on Mechanical Properties of SiC–particle/$Si_3N_4$ Composites", J Ceram Soc JP 100 (4) 1992, pp. 463–467.

Licko, T. et al., "Preparation of alpha–Silicon Nitride Powder and Ceramics Reinforced beta–Silicon Nitride Whiskers", *Inst Inorg Chem* 1991, 35(2) 127–45 (Abstract Only).

Y. Fukushhige et al., "Phase Composition of Reaction Products (Silicon Nitride and Silicon Carbide) from the Silicon Dioxide–Carbon–Nitrogen–Hydrogen System", *Yogyo Kyokaishi* 1985, 93(6) 289–94 (Abstract Only).

J. Russ, "Computer–Assisted Microscopy", Plenum Press, 1990, p. 182 and 192.

SILICON NITRIDE/SILICON CARBIDE COMPOSITE POWDERS

GOVERNMENT LICENSE RIGHTS

The U.S. Government has a paid-up license in this invention and the right in limited circumstances to require the patent owner to license others on reasonable terms as provided for by the terms of contract Number 86X-SK761C awarded by the Department of Energy.

This is a division of application Ser. No. 08/227,751 filed Apr. 14, 1994.

BACKGROUND OF THE INVENTION

The invention relates to synthesis of silicon nitride/silicon carbide ($Si_3N_4$/SiC) composite powders via carbothermal reduction of a mixture of silica ($SiO_2$) and carbon (C) powders, particularly to those composite powders wherein the silicon carbide portion contains an amount of nitrogen, and to resulting composite powders. The invention also relates to densified bodies, including self-reinforced silicon nitride (SRS) bodies, prepared from the composite powders, especially to those densified by pressureless sintering.

A known method of preparing $Si_3N_4$ powder is carbothermal synthesis, a reaction of nitrogen with $SiO_2$ powder contained in an admixture of $SiO_2$ and carbon (especially powdered carbon). Komeya et al. (U.S. Pat. No. 4,428,916) prepare alpha-$Si_3N_4$ ($\alpha$-$Si_3N_4$) powder in a nonoxidizing atmosphere by adding a seed such as $Si_3N_4$ powder, SiC powder or silicon oxynitride (SiON) powder, to the admixture. EP 206,795 teaches that addition of silicon (Si) metal increases $\alpha$-$Si_3N_4$ yield. Inoue et al. (U.S. Pat. No. 4,514,370) use a $Si_3N_4$ seed that is prepared by carbothermal synthesis at a temperature of 1350°–1550° Centigrade (° C.). DT 2,818,545 teaches that $\alpha$-$Si_3N_4$ seed yields a product with a high $\alpha$-$Si_3N_4$ content. JP 63-176,301 uses a $Si_3N_4$ seed having a beta-$Si_3N_4$ ($\beta$-$Si_3N_4$) content of 5–50 weight percent (wt %), based on seed weight, to prepare $Si_3N_4$ powder with a $\beta$-$Si_3N_4$ content of 1–20 wt %, based on powder weight. JP 80-015,946 discloses use of a carbohydrate, such as sucrose or starch, as a binder for mixed metal oxide powders and calcining the binder to form a carbonaceous residue. Niihara et al. (U.S. Pat. No. 5,134,097) densify a physical mixture of $Si_3N_4$ and SiC powders to form a material having a matrix phase wherein SiC grains are located between and within $Si_3N_4$ grains and a disperse phase of SiC grains and SiC whiskers. Pyzik et al. (U.S. Pat. Nos. 4,883,776; 4,919,689; 5,021,372; 5,091,347; 5,118,645; and 5,120,328) prepare SRS ceramic bodies from mixtures of $Si_3N_4$ powder and other powdered components that help densify the mixture (densification aids), convert $\alpha$-$Si_3N_4$ to $\beta$-$Si_3N_4$ (conversion aids) and cause the $\beta$-$Si_3N_4$ to form elongated whiskers (whisker growth enhancing aids). Pyzik et al. require at least one of each aid.

A second method of preparing $Si_3N_4$ powder, known as direct nitridation, reacts silicon (Si) metal with nitrogen. The resulting powder may contain substantial impurity levels. Although hydrofluoric acid may be used to leach out at least some of these impurities, its use tends to lead to high residual fluorine contents.

A third method of preparing $Si_3N_4$ powder, known as diimide synthesis, reacts a halogenated silane compound and a nitrogen compound such as ammonia. The resulting powder has a residual chlorine content of at least 10 parts per million (ppm) of powder.

SUMMARY OF THE INVENTION

A first aspect of the invention is a process for preparing a silicon nitride-silicon carbide composite powder, the silicon carbide portion containing nitrogen, which comprises heating an admixture that comprises crystalline silica powder, carbon powder, and, optionally, crystalline silicon nitride powder to a temperature of from about 1350° C. to about 1600° C. in the presence of a nitrogen-containing atmosphere, preferably flowing, for a period of time sufficient to convert the admixture to a composite $\alpha$-silicon nitride/silicon carbide powder, the silicon carbide portion of the powder having a mean number diameter within a range of from about 10 to about 700 nanometers and containing an amount of nitrogen, as determined by parallel electron energy loss spectroscopy, within a range of from about 2 to about 10 percent by weight of the silicon carbide portion.

Mean number diameter (MND), also known as mean equivalent circular diameter, is a calculated value determined as described by John C. Russ, in *Computer Assisted Microscopy: The Measurement and Analysis of Images*, at pages 182 and 192 (1990).

In a preferred variation of the first aspect, the admixture is, prior to heating to the temperature of from about 1350° C. to about 1600° C. blended with a binder composition and formed into shaped masses of material that are then converted to calcined masses by heating them to a temperature sufficient to decompose components of the binder composition into a solid carbonaceous residue and maintaining that temperature until evolution of residual gases effectively ceases, the calcined masses having a carbon content that is greater than stoichiometrically required to reduce the silica via carbothermal reduction.

"Shaped masses of material", "shaped masses" and "masses" are used interchangeably to refer to a mass or body that has a shape suitable for processing as described herein. The shape is not particularly critical and may take on any solid geometric configuration such as spherical, ellipsoidal, cylindrical or conical. Commonly used terms for such shapes include, without limitation, "aggregates", "granules" and "pellets". As such, these terms may also be used interchangeably with masses and its equivalents.

A second aspect of the invention is a silicon nitride-silicon carbide composite powder comprising a silicon nitride phase that is at least 90 percent by weight, based upon phase weight, $\alpha$-silicon nitride and a silicon carbide phase that is in the form of particles having a mean number diameter within a range of from about 10 to about 700 nanometers, the silicon carbide phase having a nitrogen content, as determined by parallel electron energy loss spectroscopy, within a range of from about 2 to about 10 percent by weight of the silicon carbide portion, the silicon carbide phase being present in an amount of from greater than zero to about 50, preferably from about 0.01 to about 25, more preferably from about 0.1 to about 15, still more preferably from about 1 to about 10 percent by weight, based upon composite powder weight, the composite powder having a BET surface area of from about 3 to about 15 $m^2/g$. The second aspect also includes silicon nitride-silicon carbide composite powders wherein the silicon carbide phase is in the form of particles having a bimodal distribution, the bimodal distribution having a first distribution peak located at a mean number diameter within a range of from about 10 to about 200 nm and a second distribution peak located at a mean number diameter within a range of from about 200 to about 700 nm.

"BET surface area" refers to powder or particle surface area as measured by a conventional adsorption method such as that taught by S. Brunauer, P. H. Emmett and E. Teller in *Journal of the American Chemical Society*, volume 60, page 309 (1938).

A third aspect of the present invention is a process for preparing a self-reinforced silicon nitride ceramic body which comprises subjecting a powdered admixture of a carbothermally synthesized silicon nitride/silicon carbide composite powder, a densification aid, a conversion aid, at least one whisker growth enhancing aid and, optionally, a catalyst to conditions of temperature and pressure sufficient to yield a ceramic body having a density of at least 96 percent of theoretical density and form, in situ, β-silicon nitride whiskers having an average aspect ratio of at least 2.5, the body having both a granular and an intragranular distribution of residual silicon carbide grains and a fracture toughness of at least 7 MPa.m$^{1/2}$, the intragranular silicon carbide grains having a mean number diameter within a range of from about 10 to about 400 nanometers, at least a portion of the intragranular silicon carbide grains containing nitrogen, as determined by parallel electron energy loss spectroscopy, in an amount that is within a range of from about 2 to about 10 percent by weight of the silicon carbide. The composite powder is preferably that of the second aspect of the invention.

A fourth aspect of the present invention is a self-reinforced silicon nitride/silicon carbide ceramic body having a density of at least 96 percent of theoretical density and comprising a crystalline phase of β-silicon nitride of which at least about 20 volume percent, as measured by viewing one plane of the body by scanning electron microscopy, is in the form of whiskers having an average aspect ratio of at least 2.5 and a glassy grain boundary phase in an amount not greater than 35 percent by weight of total body weight, the silicon carbide being distributed, with respect to the β-silicon nitride whiskers, as granular and intragranular submicrometer grains, the body having a fracture toughness of at least 7 MPa.m$^{1/2}$, the intragranular silicon carbide grains having a mean number diameter within a range of from about 10 to about 400 nm, at least a portion of the intragranular silicon carbide grains containing nitrogen, as determined by parallel electron energy loss spectroscopy, in an amount that is within a range of from about 2 to about 10 percent by weight of the silicon carbide. The self-reinforced silicon nitride/silicon carbide ceramic body of this aspect is preferably prepared using the process of the the third aspect and the composite powder of the second aspect.

A fifth aspect of the present invention is a silicon nitride-silicon carbide composite powder having a silicon nitride phase and a silicon carbide phase, the silicon nitride phase having a phase purity of >10% β-Si$_3$N$_4$ and comprising rod-like β-Si$_3$N$_4$ crystallites that have a mean number diameter of about 0.04 μm, the number diameter ranging from about 0.01 to about 0.10 μm, and a mean aspect ratio of from about 5/1 to about 8/1, ranging from about 1.5/1 to about 21/1 and α-Si$_3$N$_4$ crystallites that have a mean number diameter of from about 0.1 to about 0.2 μm, the number diameter ranging from about 0.03 to about 0.5 μm.

The composite powders of the fifth aspect are prepared via a modification of the process of the first aspect of the present invention. The modification comprises using a seed Si$_3$N$_4$ that has a β-Si$_3$N$_4$ content in excess of 75 wt %.

DESCRIPTION OF PREFERRED EMBODIMENTS

Preparation of the composite α-silicon nitride/silicon carbide powder via carbothermal reduction is represented by an equation as follows:

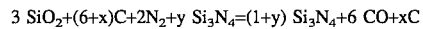

$$3\ SiO_2 + (6+x)C + 2N_2 + y\ Si_3N_4 = (1+y)\ Si_3N_4 + 6\ CO + xC$$

wherein x is a real number within a range of from greater than 0 to about 18 and y is a real number within a range of from 0 to about 1.28. A stoichiometric amount of carbon (C) would require x to be 0. The real number for x is desirably from about 0.6 to about 12, preferably from about 0.6 to about 6. The real number for y is desirably from about 0.05 to about 1.1, preferably from about 0.15 to about 0.9, more preferably from about 0.2 to about 0.8, still more preferably from about 0.26 to about 0.77, and most preferably from about 0.26 to about 0.52.

Three terms may be used to describe the distribution of SiC grains relative to Si$_3$N$_4$ grains in sintered bodies containing both. "Granular" refers to SiC grains dispersed in glassy grain boundary pockets located at triple points between Si$_3$N$_4$ grains. "Intragranular" refers to SiC grains dispersed within Si$_3$N$_4$ grains. "Intergranular" refers to SiC grains disposed along grain boundaries between two adjacent Si$_3$N$_4$ grains.

Temperatures and temperature ranges disclosed herein are primarily intended as guidelines. With changes in measurement device, reactor or other apparatus, or location of temperature measurement, some variation is expected. A skilled artisan can readily determine appropriate adjustments of the temperatures or temperature ranges without undue experimentation.

As noted in the first aspect, an admixture suitable for use in preparing silicon nitride-silicon carbide composite materials contains crystalline silica powder, carbon powder and optionally, crystalline silicon nitride powder. Components of the admixture are also referred to as starting materials. Proper selection of carbon and silica sources for use as starting materials and seeding with fine Si$_3$N$_4$ crystallines allow control of the size of Si$_3$N$_4$ and SiC crystallines in resultant composite powders. The size of SiC crystallites depends, to some extent, on starting carbon crystallite size. With all other parameters being equal, as carbon crystalline size decreases so does composite powder SiC crystallite size. SiC crystalline size is largely unaffected by SiO$_2$ source or the presence or absence of seed. The size of Si$_3$N$_4$ crystallines depends heavily upon the presence of seed and the surface area and crystallinity of the starting SiO$_2$. The size of starting carbon powder has much less, if any, effect on the resulting Si$_3$N$_4$ crystallite size. A high purity composite powder with a SiC grain size (MND) less than about 100 nm, preferably less than about 50 nm, and a Si$_3$N$_4$ grain size (MND) of about 0.2 μm can be produced by reacting a seeded (0.2 seed/SiO$_2$ ratio and high purity α-phase Si$_3$N$_4$) acetylene carbon black/high purity quartz precursor.

Si$_3$N$_4$ crystallites tend to contain small pores described as "micropores". In addition to having an effect upon SiC crystallite size, the starting carbon crystallite size also has an effect upon micropore size. As a general rule, an increase in carbon crystallite size leads to a corresponding increase in micropore size.

Starting material (carbon and silica) purity has a measurable effect upon resultant composite powder purity. Each raw material or starting material has a purity that is desirably at least 96%, preferably at least 98.6, more preferably at least 98.9, still more preferably at least 99.5% and most preferably greater than or equal to 99.8%.

The silica is preferably provided by crystalline quartz that is at least 98.9, more preferably at least 99.5% and most preferably at least 99.8% pure. The quartz preferably has a surface area (S.A.) of greater than (>) 0.2 square meters per gram ($m^2/g$) and a mean particle size ($d_{50}$) by weight percent (wt %), as determined by laser light scattering using a model SPA MICROTRAC™ apparatus, of less than 15 micrometers (μm). If a different subscript, such as $d_{10}$ is used in conjunction with a specified particle size, it means that 10 weight percent of the particles have a particle size less than or equal to the specified size. Silica mean particle size may be reduced by milling using a jet mill wherein the wear parts are fabricated from $Si_3N_4$, SiC or $B_4C$ and other non-wearing parts are lined with urethane. The $SiO_2$ mean particle size ($d_{50}$), is more preferably less than about 10 μm.

The carbon powder used as a starting material has a surface area that is preferably at least 20 $m^2/g$, more preferably at least 25 $m^2/g$, and most preferably at least 70 $m^2/g$. Average particle sizes (MND) that correspond respectively to the surface areas are 0.10 μm, 0.06 μm and 0.03 μm.

Silica purity and morphology also affect whether the composite powder has $\beta$-$Si_3N_4$ whiskers or fibers protruding from $\alpha$-$Si_3N_4$ crystallites. The protruding $\beta$-$Si_3N_4$ whiskers occur when the $SiO_2$ is either amorphous, without regard to purity, or crystalline, but relatively impure. A moderately sized (surface area of 1.9 $m^2/g$ or greater), high purity (greater than 99.8%) crystalline quartz yields $\alpha$-$Si_3N_4$ crystallites from which few, if any, $\beta$-$Si_3N_4$ whiskers or fibers protrude.

Although satisfactory silicon nitride-silicon carbide composite powders can be prepared from admixtures that lack crystalline silicon nitride, it is a preferred admixture component. The crystalline silicon nitride serves as a seed material.

One preferred seed material has an $\alpha$-$Si_3N_4$ phase content of at least about 90 wt %, preferably at least 95 wt %, based upon $Si_3N_4$ weight, a SiC content of less than about 1.5 wt %, a $SiO_2$ content of less than about 10 wt %, the SiC and $SiO_2$ contents being based upon seed material weight, and a surface area of at least 7.5 $m^2/g$, preferably at least 10 $m^2/g$. The SiC and $SiO_2$ contents are calculated based upon an assumption that all carbon in the composite powder is in the form of SiC and all oxygen in the composite powder is present as $SiO_2$. All subsequent references to SiC and $SiO_2$ content of a composite powder are based upon this assumption. Occasionally, however, other forms of carbon, such as graphite particles or carbon tubes, may be observed.

A second preferred seed material is a high purity $\alpha$-$Si_3N_4$/SiC powder prepared by carbothermal synthesis, as described herein, and having a $Si_3N_4$ content of at least 95 wt %, and a combination of an amount of SiC and an amount of a $SiO_2$, each amount being greater than 0.0 wt %, that totals no more than 5 wt %, all percentages being based on powder weight. The seed also has: a surface area of from about 3 to about 15 $m^2/g$, desirably about 7.5 $m^2/g$; a $d_{10}$ of from about 0.1 to about 0.5 μm, desirably about 0.38 μm; a $d_{50}$ of less than about 1 μm, desirably from about 0.5 to about 1 μm, and preferably about 0.86 μm; and a $d_{90}$ of from about 1 to about 4 μm, desirably about 2.5 μm. The seed is desirably present in an amount sufficient to provide a ratio of seed/$SiO_2$ that falls within a range of from about 0.05:1 to about 1:1. The ratio is preferably from about 0.1:1 to about 0.6:1, more preferably from about 0.15:1 to about 0.4:1, and most preferably about 0.2:1.

A third preferred silicon nitride seed material has a $\beta$-$Si_3N_4$ phase content of at least 75 wt %. The use of this seed material yields a $Si_3N_4$/SiC composite powder wherein the $Si_3N_4$ phase contains both $\alpha$-$Si_3N_4$ and $\beta$-$Si_3N_4$, the $\beta$-$Si_3N_4$ being present in an amount of at least 10 wt %, based upon total $Si_3N_4$ content. The $\beta$-$Si_3N_4$ is in the form of rod-like $\beta$-$Si_3N_4$ crystallites that have a MND of about 0.04 μm, the number diameter ranging from about 0.01 to about 0.10 μm, and a mean aspect ratio of from about 5/1 to about 8/1, ranging from about 1.5/1 to about 21/1 and $\alpha$-$Si_3N_4$ crystallites that have a MND of from about 0.1 to about 0.2 μm, the number diameter ranging from about 0.03 to about 0.5 μm.

The admixture may also include an amount of silicon metal powder. When used, the amount should be sufficient to provide a ratio of silicon metal powder to silicon dioxide powder that falls within a range of from about 0.05:1 to about 1:1. The range is preferably from about 0.1:1 to about 0.5:1.

The admixtures used to prepare the silicon nitride-silicon carbide composite powders may be heated to a reaction temperature as is. The admixtures are, however, preferably blended with a binder composition prior to heating to the reaction temperature.

The binder composition is desirably a product of a condensation reaction between at least one first reactant that has at least one reactive hydroxyl moiety and at least one second reactant having at least one reactive nitrogen-containing moiety. The first reactant is desirably selected from monosaccharides, disaccharides, polysaccharides, starches, modified starches, soy protein, cellulose ethers and cellulose ether derivatives. The second reactant is desirably an amine or an amide.

The first reactant is preferably selected from sucrose, fructose, glucose, mannose, xylose, raffinose, dextrin, amylose, maltose, lactose, arabinose, dextrose, galactose, amylopectin, glucose polymers, xylose polymers, copolymers of glucose and xylose (gluco-xylans), invert sugar, partially invert sugar, molasses from sucrose refining, whey from milk processing, corn syrup, starch, modified starch, methylcellulose, ethylcellulose, hydroxypropylmethylcellulose, hydroxyethylcellulose, sodium carboxymethylcellulose, carboxymethylcellulose and soy protein. The first reactant is more preferably at least one of corn starch, wheat starch, sucrose, fructose, soy protein, and cellulose ethers.

The second reactant is preferably selected from cyanoguanadine, melamine, urea, hexamethylene tetramine, trimethylamine, diethanolamine, triethanolamine, tetramethylene diamine, acetoguanamine, benzyldimethylamine, methylolmelamine, alkylated methylolmelamine, hexamethoxymethyl melamine, N,N'-dimethyl-p-phenylene diamine, tetraaminobenzene, diaminobenzidine, thiourea, formamide, acetamide, benzamide, oxamide, succinamide, malonamide, guanidine, biuret, triuret, dicyandiamide, biurea, ethylene urea, ammelide, ammeline, aminoguanidine, semicarbazide, thiosemicarbazide and acrylamide. The second reactant is more preferably melamine, hexamethylene tetramine, cyanoguanadine or urea.

The terms "starch" and "modified starch", as used herein, are defined in *Condensed Chemical Dictionary*, Eleventh Edition, Van Nostrand Reinhold Company, Inc. (1987), at pages 1089–90. The definitions are as follows:

Starch (CAS: 9005-84-9 ), a carbohydrate polymer having the following repeating unit:

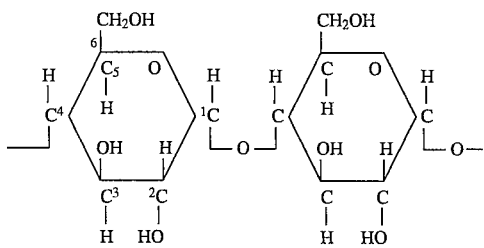

It is composed of about 25% amylose (anhydroglucopyranose units joined by glucosidic bonds) and 75% amylopectin, a branched-chain structure. Properties: White, amorphous, tasteless powder or granules; various crystalline forms may be obtained, including microcrystalline. Irreversible get formation occurs in hot water; swelling of granules can be induced at room temperature with such compounds as formamide, formic acid, and strong bases and metallic salts. Occurrence: Starch is a reserve polysaccharide in plants (corn, potatoes, tapioca, rice, and wheat are commercial sources).

Starch, modified.

Any of several water-soluble polymers derived from a starch (corn, potato, tapioca) by acetylation, chlorination, acid hydrolysis, or enzymatic action. These reactions yield starch acetates, esters, and ethers in the form of stable and fluid solutions and films. Modified starches are used as textile sizing agents and paper coatings. Thin-boiling starches have high gel strength, oxidized starches made with sodium hypochlorite have low gelling tendency. Introduction of carboxyl, sulfonate, or sulfate groups into starch gives sodium or ammonium salts of anionic starches, yielding clear, non-gelling dispersions of high viscosity. Cationic starches result from addition of amino groups. The glucose units of starch can be crosslinked with such agents as formaldehyde, soluble metaphosphates, and epichlorohydrin.

The admixture of crystalline silica powder, carbon powder, and, optionally crystalline silicon nitride powder may, without any intermediate processing, be heated to a reaction temperature of from about 1350° C. to about 1600° C. in the presence of a nitrogen-containing atmosphere, preferably flowing, for a period of time sufficient to convert the admixture to a composite α-silicon nitride/silicon carbide powder. A preferred procedure includes intermediate processing steps prior to heating to the reaction temperature. In the preferred procedure, the admixture is added to a binder composition, mixed with water, preferably deionized water, and converted into a blended material using conventional apparatus such as a ball mill that is partially filled with suitable media, preferably $SiO_2$-based media. Other media may also be used provided the media does not react with the starting materials or adversely affect resulting powders or articles prepared from the powders. A milling time of from about 30 minutes to about 10 hours, preferably from about 2 to about 6 hours, yields a blended material suitable for further processing into shaped masses of material. Further processing also uses conventional apparatus, such as an extruder, to convert the blended material into moist shaped masses such as pellets. The pellets may be of any shape or configuration that does not interfere with further processing. A cylindrical shape provides satisfactory results.

The nitrogen-containing atmosphere may be established by gaseous nitrogen, gaseous ammonia, gaseous mixtures of nitrogen and ammonia, gaseous mixtures of nitrogen, ammonia or both with an inert or noble gas such as argon, or gaseous mixtures of nitrogen, ammonia or both with hydrogen and, optionally, an inert or noble gas. The presence of ammonia tends to increase the amount of silicon carbide formed in the composite powders. The nitrogen-containing atmosphere may be static or flowing, but is preferably flowing. If the atmosphere is static, it must have a volume sufficient to maintain carbon monoxide generated during carbothermal reduction at a level below that which slows down or terminates carbothermal reduction. A level of carbon monoxide of less than about 3 percent by volume, preferably less than about 1.5 percent by volume, based upon total atmosphere volume is believed to be satisfactory.

The moist shaped masses are desirably placed in a container such as a quartz boat. The container and its contents ape then placed in an apparatus, such as a tube Furnace, and heated, under flowing nitrogen, inert gas or air, preferably nitrogen, to a temperature and maintained at that temperature for a period of time sufficient to dry the pellets and allow a condensation reaction between the first and second reactants to occur. The time and temperature will vary somewhat depending upon size of the shaped masses, their moisture content, choice of binder composition components and relative amounts of all components of the shaped masses. When using, for example, a blend of wheat and corn starches as a first reactant and melamine as a second reactant to form wet pellets having a diameter of ¼ inch (0.6 cm) and a length of ⅜ inch (1.0 cm), a temperature of 150° Centigrade (° C.) and a time of two hours is sufficient. Longer times are generally needed with lower temperatures. Suitable times and temperatures for other reactants, pellet sizes and component ratios are readily determined without undue experimentation.

After the condensation reaction is substantially complete, the shaped masses are heated to a higher temperature and maintained at that temperature for a period of time sufficient to calcine the shaped masses. As used herein, "calcine" means that the shaped masses are heated under an inert atmosphere, such as that provided by nitrogen or an inert gas such as argon, at a temperature sufficient to decompose components of the binder composition into a carbonaceous residue and maintained at that temperature until evolution of residual gases effectively ceases (approaches a rate of evolution of 0 liters per minute) at that temperature. If desired, air can be substituted for inert gas at temperatures below that at which carbon will oxidize. Calcination temperatures typically range from about 250° C. to about 1000° C., preferably from about 300° C. to about 350° C. Continuing the foregoing example, the shaped masses are heated to a temperature of 330° C. over a period of 30 minutes and maintained at that temperature for a period of two hours. The tube furnace and its contents are then cooled to ambient temperature to yield calcined masses suitable for reaction to provide the composite powders. As in the case of effecting the condensation reaction, suitable times and temperatures for other reactants, shaped mass sizes and component ratios are readily determined without undue experimentation.

The admixture or the calcined masses (where the preferred intermediate processing steps are used) is/are heated to a reaction temperature of from about 1350° C. to about 1600° C. in the presence of a flowing nitrogen-containing atmosphere. Using the calcined masses for purposes of illustration, the calcined masses may be added to a reactor and then heated to the reaction temperature (slow heating) or added directly to a preheated reactor (rapid heating). For slow heating, an aliquot of the calcined masses is suitably placed in a crucible adapted for mixing crucible contents that is then placed in a rotary reactor apparatus prior to heating to the reaction temperature. Other apparatus, such as a pusher furnace, may also be used. For rapid heating, the aliquot may be added to a preheated crucible through which a nitrogen-containing gas flows. Rapid heating preferably occurs at a rate of greater than about 100° C./sec and is believed to generate high local concentrations of volatile silicon monoxide (SiO) gas. These concentrations are believed to favor nucleation of $\alpha$-$Si_3N_4$ particles over growth of $\alpha$-$Si_3N_4$ particles. Heating rates of less than 100° C./second, also known as "slow heating", are believed to favor particle growth over particle nucleation. The apparatus used for either rapid heating or slow heating is not particularly critical and a skilled artisan can scale up from the apparatus used in succeeding examples to batch or continuous apparatus capable of handling larger quantities of starting material admixtures or calcined masses without undue experimentation.

The foregoing process may be modified to produce a silicon nitride-silicon carbide composite powder wherein the silicon carbide portion is present as a bimodal distribution. The presence of the bimodal distribution may be detected by transmission electron microscopy. A suitable modification involves heating to two different reaction temperatures. A first reaction temperature, maintained for a first period of time, is from about 1350° C. to less than 1500° C. The first period of time is preferably from about 120 to about 470 minutes and the first temperature is preferably from about 1425° to about 1490° C. A second reaction temperature, maintained for a second period of time that is shorter than the first period of time, is at least 1500° C., but less than about 1600° C. The second period of time is from preferably about 10 to about 120 minutes, and the second temperature is preferably from about 1500° to about 1600° C. Skilled artisans recognize than a multimodal (greater than bimodal) distribution of the silicon carbide portion is attainable by further apportioning of reaction temperatures and allocating appropriate periods of time.

The bimodal distribution preferably has a first distribution peak and a second distribution peak as determined from transmission electron micrographs. The first distribution peak is preferably located at a MND within a range of from about 10 to about 200 nanometers (nm). The second distribution peak is preferably located at a MND within a range of from about 200 to about 700 nm.

A second modification of the process provides for early preparation of at least some silicon carbide. The second modification, like the modification to generate a bimodal distribution of the silicon carbide portion, involves use of more than one reaction temperature. In this modification, heating proceeds to an initial temperature that thermodynamically favors formation of silicon carbide over formation of silicon nitride for a first period of time to generate submicrometer SiC crystallites. The initial temperature and the first period of time are sufficient to provide the composite powder with a silicon carbide content that is greater than 0 wt %, but less than about 50 wt %, based upon composite powder weight. The silicon carbide is in the form of crystallites having a MND that ranges from about 10 nm to about 700 nm. The initial temperature is preferably within a range of 1500°–1550° C. and the first period of time is from about 1 minute to about 45 minutes. Heating then proceeds at a second temperature that favors formation of $Si_3N_4$ over SiC for a second period of time that is longer than the first period of time. The second temperature is within a range of from about 1350° C. to less than 1500° C. and the second period of time is from about 375 minutes to about 419 minutes.

Modification of the process is not limited to manipulation of the reaction temperature. The silicon nitride-silicon carbide composite powder may be subjected to post synthesis procedures. One such procedure heats the composite powder to a temperature within a range of from about 500° C. to about 1000° C. in an oxidizing atmosphere for a period of time sufficient to effect removal of excess free carbon. The oxidizing atmosphere is established by any gas that will oxidize free carbon into a gaseous phase such as carbon monoxide or hydrogen cyanide at that temperature. The gas is suitably air, mixtures of air and nitrogen, ammonia, carbon dioxide, mixtures of carbon dioxide and carbon monoxide, hydrogen, mixtures of hydrogen and a hydrocarbon, or other oxidizing atmospheres known to those skilled in the art. The period of time is within a range of from about 10 minutes to about 6 hours. After removal of excess free carbon, the composite powder has a silicon nitride phase that is at least 90 percent by weight, based upon silicon nitride phase weight, $\alpha$-silicon nitride and a silicon carbide phase. The silicon carbide phase is in the form of particles having a MND within a range of from about 10 to about 700 nanometers. The silicon carbide phase is present in an amount of from greater than 0 to about 50 percent by weight, based upon composite powder weight, the composite powder having a BET surface area of from about 3 to about 15 $m^2/g$. The silicon carbide phase has a nitrogen content, as determined by parallel electron energy loss spectroscopy, within a range of from about 2 to about 10 percent by weight of the silicon carbide portion A second procedure, which may be used in place of, or subsequent to, the procedure to remove excess carbon subjects the composite powder to a heat treatment in the presence of nitrogen or an inert gas such as argon (or mixtures thereof), preferably flowing, at a temperature within a range of from 1400° C. to about 1500° C. in a nonoxidizing atmosphere for a period of time sufficient to cause at least a portion of residual silicon dioxide to react with at least a portion of the silicon carbide. The heat treatment yields a composite powder with an increased silicon nitride content relative to the composite powder prior to the heat treatment. The period of time falls within a range that is desirably from more than about five minutes to at least about 24 hours, preferably from about 4 hours to about 12 hours.

The composite powders may be subjected to additional post synthesis processing after the heat treatment. The additional processing may include washing, leaching, grinding or a combination thereof. In some cases, it may be advantageous to wash the composite powder with water, an aqueous solution or a nonaqueous solution. Washing removes some excess carbon while improving handling characteristics of the composite powders by removing or reducing static charge associated with composite powder surfaces. Washing may be accomplished by placing the composite powder in a bath of a liquid medium such as water. With mild mechanical agitation, ultrasonic mixing or both, at least a portion of excess carbon separates from the composite powder and floats to the bath's upper surface. The excess carbon is removed from the upper surface before the composite powder is recovered and dried. In other cases, it may be advantageous to use starting materials that contain metallic impurities. Advantages may stem from economic considerations or a desire to control final product characteristics. Leaching, or removal of metallic impurities, may be accomplished by treating the heat treated powder with any of a variety of acids such as hydrochloric acid, hydrofluoric acid or nitric acid. Hydrofluoric acid also removes at least a portion of residual $SiO_2$ in the product. A grinding or milling step may be used to control particle size and particle size distribution of the composite powders. Conventional apparatuses, such as an attritor or a ball mill, may be used for grinding. The composite powders may be used as a seed for subsequent synthesis of composite powders. If used as a seed, they may be used as synthesized or subsequent to milling.

Composite powders prepared with high purity starting materials and a high purity α-$Si_3N_4$ seed also have high purity: an α-$Si_3N_4$ phase purity of at least 95%; a $Si_3N_4$ crystallite MND of less than 0.3 μm; a surface area that lies within a range of from about 8 to about 13 m²/g; a SiC content within a range of from greater than 0 to about 50, preferably from about 0.01 to about 25, more preferably from about 0.1 to about 15, still more preferably from about 1 to about 10 wt %, based upon powder weight; and a SiC crystallite MND within a range of from about 10 to about 700 nm, desirably from about 10 to about 400 nm, and preferably less than 100 nm, more preferably less than 50 nm. At least a portion of the SiC crystallites have a nitrogen content of from about 2 to about 10 wt %, based upon SiC weight. The $Si_3N_4$/SiC composite also has: less than 2 wt % residual oxygen as monatomic 0; and residual elemental impurities of less than 100 ppm calcium (Ca), less than 50 ppm iron (Fe), less than 200 ppm (preferably less than 50 ppm) aluminum (Al), less than 20 ppm sulfur (S), less than 50 ppm (preferably less than 10 ppm) fluorine (F), less than 10 ppm potassium (K) and less than 10 ppm chlorine (Cl). In addition, the α-$Si_3N_4$ crystallites are substantially free of protruding β-$Si_3N_4$ fibers.

The size and quantity of α-$Si_3N_4$ crystallites included as a seed in a starting powder mixture affect the size of α-$Si_3N_4$ crystallites in a product. Specifically, α-$SiBN_4$ crystallites with a MND of less than 0.3 μm are prepared by reacting a precursor containing seed α-$Si_3N_4$ crystallites that have a MND of less than 0.2 μm and are present in an amount sufficient to establish a precursor seed/$SiO_2$ ratio of at least 0.15:1.

Composite powder composition and purity lead, in turn, to densified parts prepared therefrom with properties such as fracture toughness, strength and Weibull modulus that are increased over those obtained with lower purity powders or with powders that contain only $Si_3N_4$. The property improvements should occur regardless of the method used in preparing such parts.

A unique rod-like β-$Si_3N_4$ morphology results from a change in the seed material from a high (greater than 90 wt %) α-phase $Si_3N_4$ powder to a high (greater than 75 wt %) β-phase $Si_3N_4$ powder. The use of the latter powder as a seed yields a $Si_3N_4$/SiC composite powder wherein the $Si_3N_4$ phase comprises both α-$Si_3N_4$ and β-$Si_3N_4$, the β-$Si_3N_4$ being present in an amount >10 wt %, based upon total $Si_3N_4$ content. The β-$Si_3N_4$ comprises rod-like β-$Si_3N_4$ crystallites that have a MND of about 0.04 μm, the number diameter ranging from about 0.01 to about 0.10 μm, and a mean aspect ratio of from about 5/1 to about 8/1, ranging from about 1.5/1 to about 21/1 and α-$Si_3N_4$ crystallites that have a MND of from about 0.1 to about 0.2 μm, the number diameter ranging from about 0.03 to about 0.5 μm.

"Powder sinterability" is a relative measure of time required to attain a desired density such as 97 percent of theoretical density. A first powder is termed more sinterable than a second powder if the first powder can be sintered to the desired density in a shorter time, under identical sintering conditions and seed/silica ratios, than the second powder. Composite powders wherein the $Si_3N_4$ phase comprises both α-$Si_3N_4$ and β-$Si_3N_4$, the β-$Si_3N_4$ being in the form of rod-like crystallites, are more sinterable than composite powders prepared with a high α-phase $Si_3N_4$ seed and lacking the rod-like β-$Si_3N_4$ crystallites. The choice of binder, where used, also has an effect upon powder sinterability. As an illustration, a sucrose-based binder generally yields a more sinterable composite powder than an equivalent amount of a starch-based binder.

Addition of an amount of silicon (Si) metal powder to a starting material composition provides a measure of control over SiC content of the composite powder without adversely affecting size of the $Si_3N_4$ component, especially the α-$Si_3N_4$ component, of the composite powder. The starting material composition typically includes $SiO_2$, carbon powder, a seed material such as $Si_3N_4$ powder, and a binder. A ratio of Si metal weight to total starting material composition weight is desirably from about 0.01:1 to about 1:1, preferably from about 0.1:1 to about 0.5:1.

Rapid heating is one means of generating, in situ, fine SiC crystallites that serve as seeds for synthesis of α-$SiBN_4$ crystallites. The SiC crystallites have a MND that ranges from about 10 nm to about 700 nm, preferably from about 30 nm to about 100 nm. A particularly suitable MND is about 50 nm. The SiC crystallites, particularly the fine crystallites, result, at least in part, from initial, rapid heating of starting material compositions to temperatures that thermodynamically favor formation of SiC over formation of $Si_3N_4$. Temperatures within a range of t500°–1550° C. provide acceptable results. Skilled artisans recognize that some SiC also forms at temperatures of less than 1500° C. The initial heating is of short duration, suitably from about 1 minute to about 45 minutes, desirably from about 5 minutes to about 30 minutes, preferably from about 5 to about 20 minutes. After the initial heating, the temperature is preferably reduced to a level that favors formation of $Si_3N_4$ over SiC. These times and temperatures are suitable for preparation of composite powders having SiC contents of no more than about 25 wt %, based upon composite powder weight. If greater SiC contents are desired, a higher initial temperature, a longer time at the initial temperature, or both should provide satisfactory results.

A measure of control over composite powder surface area can be gained by varying excess carbon content, seed content or both in the shaped and calcined masses of starting materials (pellets). These parameters affect rates of nucleation and rates of growth of $Si_3N_4$ particles. An increase in excess carbon or a decrease in seed content, as reflected by a ratio of seed to $SiO_2$ in the calcined pellets, leads to an increase in composite powder surface area. A decrease in excess carbon or an increase in seed content, as reflected by the ratio of seed to silica in the calcined pellets, leads to a decrease in composite powder surface area. Therefore, a desired composite powder surface area can be attained by adjusting excess carbon content, seed/silica ratio or, preferably, both.

Post synthesis heat treatment of composite powders may be used to alter powder SiC and $SiO_2$ contents. It is believed, without intending to be bound thereby, that at least a portion of residual SiC reacts with at least a portion of residual $SiO_2$ during heating in the presence of nitrogen or an inert gas such as argon (or mixtures thereof), preferably flowing, at a temperature of from about 1400° C. to about 1500° C. for a period of time that ranges from less than 4 hours to more than 12 hours. A heat treatment time of as few as 5 minutes produces negligible changes in residual SiC and $SiO_2$ contents and may be uneconomical. Times in excess of 12 hours, such as 24 hours or more, while usable, provide diminishing economic returns. Suitable times will vary depending upon the heat treatment temperature as well as upon other variables such as amount of SiC and $SiO_2$ as well as particle size. By way of illustration, heat treatment of a composite powder having a residual $SiO_2$ content of 4.4 wt % and a residual SiC content of 1.5 wt % for 12 hours at 1500° C. yields a residual $SiO_2$ content of 2.03 wt % and a residual SiC content of 0.9 wt % whereas a heat treatment of the same powder for 4 hours at 1400° C. yields a residual $SiO_2$ content of 3.4 wt % and a residual SiC content of 1.4 wt %. The heat treatment also decreases internal porosity of powder particles and causes the particles to take on a more spherical shape. The decrease in porosity is accompanied by a concurrent decrease in powder surface area and leads to a solid or near solid crystallite structure.

The composite powders of the present invention are suitable for use in preparing SRS ceramic bodies. SRS ceramic bodies are formed at elevated temperatures, either with applied pressure, as in hot pressing, or with little or no applied pressure, as in low pressure gas sintering or pressureless sintering. The composite powders are combined with suitable densification aids, conversion aids, whisker growth enhancing compounds and, optionally, preformed reinforcing materials. U.S. Pat. No. 5,021,372 defines densification aids (column 5, lines 49-61), conversion aids (column 6, lines 19-27) and whisker growth enhancing compounds (column 7, lines 4-18). U.S. Pat. No. 5,021,372 also includes suitable compounds and amounts for such densification aids (column 5, line 62 through column 6, line 18), conversion aids (column 6, lines 35-55) and whisker growth enhancing compounds (column 7, line 19 through column 8, line 52). These teachings and those of related U.S. Pat. Nos. 5,091,347; 5,098,449; 5,120,328; 5,118,645; 5,120,328; and 5,160,508 that discuss one or more of densification aids, conversion aids, whisker growth enhancing compounds and preformed reinforcing materials are incorporated herein by reference.

A densification aid is a compound that forms a liquid phase into which $\alpha\text{-}Si_3N_4$ dissolves and in which mass transport rates of the silicon and nitrogen are quite rapid. The temperature at which the liquid phase forms varies with the densification aid. A conversion aid is a compound that forms a glassy phase through which mass transport is, in general, considerably slower than in the densification aid. Thus, $\alpha\text{-}Si_3N_4$ dissolves in the conversion aid on heating, but is not readily densified. Notwithstanding this lack of densification, the conversion aid promotes rapid, essentially complete conversion of $\alpha\text{-}Si_3N_4$ to $\beta\text{-}Si_3N_4$. Whisker growth enhancing compounds promote formation of $\beta\text{-}Si_3N_4$ whiskers.

A self-reinforced silicon nitride/silicon carbide ceramic body is desirably prepared by subjecting a powdered admixture of the silicon nitride/silicon carbide composite powder (prepared as described herein), a densification aid, a conversion aid, at least one whisker growth enhancing aid and, optionally, a catalyst to conditions of temperature and pressure sufficient to yield a ceramic body having a density of at least 96 percent of theoretical density and form, in situ, β-silicon nitride whiskers having an average aspect ratio of at least 2.5. The body has both a granular and an intragranular distribution of residual silicon carbide grains and a fracture toughness of at least 7 $MPa.m^{1/2}$. The intragranular silicon carbide grains have a MND within a range of from about 10 to about 400 nanometers. At least a portion of the intragranular silicon carbide grains contain nitrogen, as determined by parallel electron energy loss spectroscopy, in an amount that is within a range of from about 2 to about 10 percent by weight of the silicon carbide. If desired, the powdered admixture may be converted to a shaped body prior to being subjected to the conditions of temperature and pressure. The resulting ceramic body has a creep resistance that is greater than that obtained by substituting silicon nitride for the silicon nitride/silicon carbide composite powder. The resulting body includes a crystalline phase of β-silicon nitride of which at least about 20 volume percent, as measured by viewing one plane of the body by scanning electron microscopy, is in the form of whiskers having an average aspect ratio of at least 2.5 and a glassy grain boundary phase in an amount not greater than 35 percent by weight of total body weight. By using the silicon nitride/silicon carbide composite powders as the starting material, the resulting ceramic body also contains silicon carbide in an amount that is within a range of from greater than 0 percent by weight to about 50 percent by weight, based upon combined weight of silicon nitride and silicon carbide.

The following examples are solely for purposes of illustration. They do not limit, either explicitly or implicitly, the scope of the present invention.

EXAMPLE 1

Prepare a raw material feed mixture by mixing 41.7 parts by weight (pbw) $SiO_2$ (a high purity crystalline quartz having an average particle size <10 μm), 33.3 pbw acetylene carbon black (commercially available from Chevron Chemical Company under the trade designation SHAWINIGAN BLACK™), and 25.0 pbw $Si_3N_4$ (UBE Industries, Limited under the trade designation SN E-10) in a ball mill half filled with a $SiO_2$-based media for five hours. Transfer the raw material feed mixture to a blender, add 8.2 pbw wheat starch, 3.5 pbw corn starch and 5.9 pbw melamine, all parts being based on 100 parts by weight of raw material feed mixture, and blend for 20 minutes. Add sufficient water to yield a consistency suitable for extrusion and blend for an additional 20 minutes. Using an extruder equipped with a cutter, convert the blended mixture to moist shaped masses in the form of pellets having a diameter of about 0.25 inch (0.6 cm) and a length of about 0.38 inch (1 cm). Heat treat the moist pellets in nitrogen for 8 hours at 150° C, increase the heat to 330° C over a period of 1 hour and maintain that temperature for an additional 7 hours before allowing the pellets to cool naturally to ambient temperature (about 25° C.). The pellets have a $Si_3N_4$seed /$SiO_2$ ratio of 0.6:1.

Place 500 grams (g) of the heat treated pellets into a graphite crucible having a diameter of 9 inches (about 23 cm) and a depth of 19 inches (about 23 cm) and being inclined at an angle of 22.5 degrees with respect to horizontal. Six graphite lifts are attached to the inside of the crucible to aid in the mixing and turnover of the pellets. Place the crucible in the center of a radio frequency (RF) induction coil and attach it to a molybdenum shaft by which the crucible can be rotated. Rotate the crucible at 3 revolutions per minute (rpm) while inductively heating the crucible contents. Heat at 30° C./minute to 1500° C. (as measured by a W-Re thermocouple in the center of the crucible) in the presence of nitrogen flowing at a rate of 40 standard liters per minute (s1 μm), hold at that temperature for 180 minutes and then allow the crucible contents to cool naturally to ambient temperature. Analysis of the pellets after cooling reveals an oxygen content of 1.19 weight percent (wt %) and a carbon content of 27.5 wt %. Remove excess carbon by heating the resultant pellets to a temperature of 700° C. and maintaining that temperature for 3 hours while flowing a 50/50 air/nitrogen mix through the pellets at a rate of 20 slpm. After carbon removal is complete, allow the pellets to cool to ambient temperature and then convert the pellets to powder. The powder has a carbon content of 0.71 wt % (2.37 wt% as SiC) and an oxygen content of 2.11 wt%, all percentages being based upon powder weight. Transmission electron microscopy (TEM) shows that She carbon is in the form of nanosized SiC particles having a diameter ranging from 10 to 70 nm (0.01 to 0.07 μm).

EXAMPLES 2–5

Repeat Example 1, but vary the reaction temperature and time at that temperature as shown in Table I. Table I also shows the carbon content, equivalent SiC content, oxygen content and BET surface area of the powder after excess carbon removal (burnout). Table I includes comparable data for Example 1. Each powder has an $\alpha$-$Si_3N_4$ content in excess of 95 wt % with SiC being in the form of nanometer-sized (nanosized) particles.

TABLE I

| Example No. | Seed: $SiO_2$ Ratio | Reaction Temp. (°C.) | Reaction Time (min) | Product Powder Properties | | | |
|---|---|---|---|---|---|---|---|
| | | | | Carbon Content (wt %) | SiC Content (wt %) | Oxygen Content (wt %) | Surface Area (m²/g) |
| 1 | 0.6:1 | 1500 | 180 | 0.71 | 2.37 | 2.11 | — |
| 2 | 0.6:1 | 1450 | 400 | 0.29 | 0.97 | 1.78 | 8.0 |
| 3 | 0.6:1 | 1475 | 300 | 0.48 | 1.60 | 1.81 | 8.5 |
| 4 | 0.6:1 | 1525 | 300 | 3.99 | 13.30 | 2.95 | 8.5 |
| 5 | 0.2:1 | 1475 | 390 | 0.53 | 1.77 | 1.94 | 11.6 |

— means not measured

The data in Table I show that reaction temperature and time at temperature have an effect upon carbon and oxygen contents of the powder. In addition, a comparison of Examples 3 and 5 shows that the seed:$SiO_2$ ratio affects the powder surface area.

EXAMPLES 6–10

Repeat Example 1, but vary the reaction temperature as shown in Table II and increase the time at reaction temperature to 390 minutes. Table II also shows the SiC content and size after carbon burnout.

TABLE II

| Example Number | Temperature (°C.) | SiC Content (wt %) | SiC MND (nm) |
|---|---|---|---|
| 6 | 1450 | 1.33 | 35 |
| 7 | 1460 | 1.67 | 60 |
| 8 | 1475 | 4.67 | 140 |
| 9 | 1485 | 9.33 | 230 |
| 10 | 1500 | 48.09 | 310 |

The data in Table II show that reaction temperature has a marked effect upon both SiC content and size. The data suggest that a powder with a desired SiC content and size can, without undue experimentation, be prepared by selecting a combination of reaction parameters. Similar results and trends are expected with other raw material compositions that are disclosed herein as well as other times at reaction temperature.

EXAMPLE 11

Repeat Example 3, but increase the time at reaction temperature to 390 minutes. In line with the formula 3 $SiO_2 + (6+x)C + 2 N_2 + y Si_3N_4 \rightarrow (1+y) Si_3N_4 + 6 CO + x C$, $y=0.77$ and $x=6$ for this mixture. The pellets have a $Si_3N_4$ seed/$SiO_2$ ratio of 0.6:1. After carbon removal or burnout, the powder has a carbon content of 0.30 wt % (1.0 wt % as SiC) and an oxygen content of 1.78 wt %. As in Example 1, the powder has an $\alpha$-$Si_3N_4$ phase content in excess of 95 wt % and contains nanosized SiC particles having a diameter ranging from 10 to 70 nm. The powder has a BET surface area of 8.0 m²/g.

EXAMPLES 12–15

Repeat Example 11, but change the amounts of $SiO_2$, C and $Si_3N_4$ and the value for y as shown in Table III. Table III also includes powder properties of the powders after carbon burnout for Examples 11–15. As in Example 11, all powders have an $\alpha$-$Si_3N_4$ phase content in excess of 95 wt % and contain nanosized SiC particles (10 to 70 nm).

TABLE III

| Example No. | Raw Material Amounts (pbw) | | | | Product Powder Properties | | |
|---|---|---|---|---|---|---|---|
| | $SiO_2$ | C | $Si_3N_4$ | y = | C (wt %) | O (wt %) | S.A.* (m²/g) |
| 11 | 41.7 | 33.3 | 25.0 | 0.77 | 0.30 | 1.78 | 8.0 |
| 12 | 45.5 | 36.4 | 18.1 | 0.51 | 0.46 | 2.49 | 9.5 |
| 13 | 49.9 | 40.0 | 10.1 | 0.26 | 0.53 | 1.94 | 11.6 |
| 14 | 52.6 | 42.1 | 5.3 | 0.13 | 0.46 | 2.22 | 12.0 |
| 15 | 55.6 | 44.4 | 0.0 | 0 | 0.5 | 2.38 | 13.0 |

*means BET Surface Area

The data in Table III show that surface area (S.A.) increases as the seed to $Si_{o2}$ ratio decreases.

The material with no seed (Example 15) has a higher S.A. than the other materials, but scanning electron microscopy (SEM) analysis shows that it has a blocky particle morphology. The blocky morphology leads to problems when the material is to be sintered. A material with a high S.A. and an equiaxed morphology is much more desirable than the blocky material from an ease of sintering point of view. At least a portion of the relatively high surface area for Example 15 is due to internal porosity. The material is, however, quite suitable for sintering if it is ground prior to sintering.

EXAMPLE 16

Prepare three composite powder batches by replicating Example 11 save for changing the value for y as shown in Table IV. Prepare a fourth composite powder batch by duplicating Example 11 save for reducing the temperature to 1450° C. The carbon content, oxygen content and surface area for each powder are also shown in Table IV.

Convert a portion of each composite powder batch into a pressureless sinterable composition in accordance with the following recipe: 86.64 wt % composite powder, 6.26 wt % $Y_2O_3$, 2.85 wt % $Al_2O_3$ and 4.25 wt % total $SiO_2$. As used herein, "total $SiO_2$" refers to a combination of $SiO_2$ contained in the composite powder and added $SiO_2$. Attrit the composition for one hour in water using $Si_3N_4$ milling media. Use a roto-evaporator to dry the attrited combination into a formulated, sinterable powder. Convert the powder into test pieces by uniaxially pressing at 2500 pounds per square inch (psi) (17 MPa) then isostatically pressing at 40,000 psi (276 MPa). Pressureless sinter the test pieces at 1750° C. for either 3 hours or 9 hours (Table IV) in a boron nitride crucible in a nitrogen atmosphere. The pressureless sintering procedure is taught in U.S. Pat. No. 5,120,328, particularly at column 8, line 3 through column 10, line 56. The relevant teachings of U.S. Pat. No. 5,120,328 are incorporated herein by reference. Table IV shows resulting densities in terms of percent of theoretical density.

TABLE IV

| | Powder Properties | | | Sintered Body (% of Theoretical Density) | |
|---|---|---|---|---|---|
| y = | Carbon Content (wt %) | Oxygen Content (wt %) | Surface Area (m²/g) | 3 Hours at 1750° C. | 9 Hours at 1750° C. |
| 0.0 | 0.72 | 2.50 | 13 | 78.6 | 76.3 |
| 0.26 | 0.50 | 2.47 | 11 | 94.6 | 98.1 |
| 0.52 | 0.52 | 2.46 | 9 | 94.4 | 98.2 |
| 0.77 | 0.29 | 1.78 | 8 | 92.0 | 98.6 |

The data in Table IV demonstrate that use of a level of seed that is intermediate between no seed (y=0.0) and more seed than needed to prepare sinterable composite powders (y is at least 0.77) is desirable when such powders are to be consolidated via pressureless sintering. As shown in Table IV, y values of 0.26 and 0.52 yield powders that are more sinterable than a y value of either 0.0 or 0.77 for a sintering time of 3 hours and a sintering temperature of 1750° C. There are no sharp demarcations at 0.26 and 0.52. As such, y values of less than 0.26, but greater than 0.0, or greater than 0.52, but less than 0.77 should provide satisfactory results. In fact, y values in excess of 0.77 may be acceptable if one is willing to accept longer sintering times. Similar results are expected under other pressureless sintering conditions, albeit with broader or narrower y value ranges. In any event, the presence of seed during powder synthesis yields powders that are more sinterable than those prepared in the absence of a seed.

EXAMPLE 17

Repeat Example 16, but change the recipe, use ethanol rather than water during attrition, a graphite crucible rather than a boron nitride crucible and a powder bed of the same composition as the recipe, and increase the sintering time to 12 hours. The recipe is: 92.77 wt % of the $Si_3N_4$ composite powder of Example 1, 1.25 wt % $Y_2O_3$, 1.45 wt % MgO, 3.85 wt % $SiO_2$, 0.50 wt % $ZrO_2$ and 0.18 wt % $Ta_2O_5$. The resultant sintered part has a density of 99.5 percent of theoretical density.

Analyzing the sintered part via TEM shows that SiC is present and dispersed throughout the part (both intragranular and granular). There are no intergranular SiC particles. The intragranular SiC has a MND of 110±70 nm and the granular SiC has a MND of 140±40 nm. As such, the granular and intragranular SiC particles appear to be equivalent in size.

This example shows that the composite powder of the present invention can be used to prepare SRS materials with nanosize SiC-reinforced $Si_3N_4$ composite structures without a need to physically mix SiC materials into a sinterable composition.

EXAMPLE 18

Repeat Example 1, but substitute 11.7 pbw of sucrose for the 8.2 pbw wheat starch and 3.5 pbw corn starch used in that example, reduce the reaction temperature from 1500° C. to 1475° C., increase the time at temperature from 180 minutes to 390 minutes, and increase the carbon burnout temperature from 700° C. to 800° C. The powder has a carbon content of 0.52 wt % and an oxygen content of 2.06 wt %, all percentages being based upon powder weight. The powder carbon content equates to a SiC content of 1.73 wt % that, by TEM, is in the form of nanosized SiC particles (diameter ranging from 10 to 70 nm). The powder has a BET surface area of 12.2 m²/g. If the combination of starches used in Example 1 is substituted for sucrose, the product powder has an oxygen content of 1.78 wt %, a carbon content of 0.30 wt % and a BET surface area of 8.0 m²/g.

This example demonstrates that product surface area can be varied based upon the binder used to prepare the heat treated pellets.

EXAMPLE 19

Repeat Example 16, but use a different recipe and sintering times of 3 and 12 hours rather than 3 and 9 hours to prepare sintered bodies using composite powders from Examples 1 and 18. The recipe is: 91.90 wt % composite powder; 1.97 wt % $Y_2O_3$, 0.93 wt % MgO; 4.43 wt % total $SiO_2$; 0.56 wt % $ZrO_2$ and 0.21 wt % $Ta_2O_5$. Table V shows the composite powder source, binder type, composite powder surface area and percent theoretical density under the given sintering conditions.

TABLE V

| Powder Source | | Powder Surface | Sintered Body % Theoretical Density | |
|---|---|---|---|---|
| Example No. | Binder | Area (m²/g) | 1750° C. 3 Hours | 1750° C. 12 Hours |
| 1 | Starch | 8.0 | 90.0 | 98.8 |
| 18 | Sucrose | 12.2 | 94.1 | 98.9 |

The data in Table V demonstrate that the choice of binder used to prepare composite powders can have an effect upon powder sinterability. Powders that can attain a higher density in a shorter time are believed to be more desirable than those that cannot attain such a density or require longer sintering times or higher sintering temperatures or both to attain an equivalent density. As such, those that are prepared with a sucrose-based binder are more sinterable than those prepared with a starch-based binder.

EXAMPLE 20

Repeat Example 14, but modify the procedure by heating to a first temperature of 1475° C. holding at that temperature for a period of 360 minutes, then heating to a temperature of 1520° C. at a rate of 5° C./min and holding at that temperature for 30 minutes before cooling. The resultant powder has a carbon content of 1.42 wt % (4.74 wt % as SiC) and an oxygen content of 2.42 wt %, all percentages being based upon powder weight. TEM shows that the carbon is in the form of SiC particles having a bimodal size distribution with distribution peaks located at MND's 0.12±0.03 μm and at 0.44±0.10 μm. Duplicating this procedure save for omitting the increase in temperature to above 1500° C. yields a monomodal distribution of SiC particle sizes.

This example shows that modifications of SiC particle size distribution are possible via manipulation of combinations of reaction temperature and reaction time.

EXAMPLE 21

Use the procedure and raw materials of Example 1, but reduce the amounts of wheat and corn starches respectively to 7.8 pbw and 3 pbw, to convert a raw material feed mixture of 47.2 pbw $SiO_2$, 37.8 pbw acetylene carbon black, 9.4 pbw $Si_3N_4$ and 5.6 pbw melamine into a product powder. The $SiO_2$ is a high purity quartz (Unimin Corp., Iota Standard) that has, in part, a Fe content of 5 ppm, an Al content of less than 50 ppm and a Ca content of less than 5 ppm. The product powder has a surface area of 10.1 $m^2/g$, a carbon content of 0.40 wt %, an oxygen content of 2.44 wt %, a Fe content of 31 ppm, an Al content of less than 50 ppm and a Ca content of 71 ppm, all parts and percentages being based upon powder weight. After milling using a jet mill wherein the wear parts are fabricated from $Si_3N_4$, SiC or $B_4C$ and other non-wearing parts are lined with urethane, the $SiO_2$ has an average particle size of less than 10 μm.

Repeat Example 17 for a combination of 91.89 wt % of the product powder, 1.97 wt % $Y_2O_3$, 0.94 wt % MgO, 4.43 wt % total $SiO_2$, 0.56 wt % $ZrO_2$ and 0.21 wt % $Ta_2O_5$. The resultant sintered part has a density of 96.5 percent of theoretical density, a room temperature strength of 795 megapascals (MPa), a fracture toughness of 7.3 $MPa \cdot m^{1/2}$ and a Weibull modulus of 18. Jet milling the heat treated pellets after completing carbon removal yields a powder with a surface area of 10.4 $m^2/g$, a carbon content of 0.41 wt %, an oxygen content of 2.4 wt %, a Fe content of 17 ppm, an Al content of less than 50 ppm and a Ca content of 67 ppm. The sintered part has a density of 96 % of theoretical density, a room temperature strength of 750 MPa, a fracture toughness of 7.3 $MPa \cdot m^{1/2}$ and a Weibull modulus of 15. If a lower purity quartz, such as Silica B (Table XII), is substituted for the high purity crystalline quartz, the product powder has correspondingly higher impurity levels. This powder converts to a sintered part having properties, such as room temperature strength and Weibull modulus, that are lower than those noted in this Example 21.

The foregoing results demonstrate that using high purity starting materials leads to $Si_3N_4$ powder with greater purity than when using lower purity starting materials. The increased purity of $Si_3N_4$ powder leads, in turn, to improved properties for sintered parts such as an increase in Weibull modulus and an increase in room temperature strength.

EXAMPLE 22

Repeat Example 17 using two different crucible environments and a mixture of 92.31 wt % of the composite powder of Example 3, 2.35 wt % $Y_2O_3$, 1.16 wt % MgO, 3.50 wt % total $SiO_2$, 0.50 wt % $ZrO_2$ and 0.18 wt % $Ta_2O_5$. One crucible environment (Environment A) is provided by a boron nitride (BN) crucible with no surrounding powder bed. The other (Environment B) is provided by a graphite crucible painted with a BN coating and filled with a powder bed of the same composition as the mixture. Analysis of the sintered parts shows that the part sintered in Environment A has a residual carbon content of 0.10 wt % and intragranular SiC with a MND of 80±40 nm and no granular SiC whereas the part sintered in Environment B has a residual carbon content of 0.39 wt %, intragranular SiC with a MND of 80±40 nm and granular SiC with a END of 220±40 nm.

It is believed, without intending to be bound thereby, that the lower carbon content, and corresponding lower SiC content, resulting from sintering in Environment A is due to a reaction of granular SiC with sintering additives such as $ZrO_2$. This reaction appears to be suppressed by sintering in Environment B. Selection and control of the sintering environment, therefore, influence the microstructure of resulting sintered parts. Similar results are expected with other composite powders and sintering additives. Some variation is expected with changes in sintering environment and sintering additive selection and amounts. It is possible, for example, to obtain an amount of granular SiC that is intermediate between those resulting from sintering in Environments A and B by using a partial powder bed or a powder bed with a different composition than the material being sintered.

EXAMPLE 23

Repeat Example 1, but use air rather than an air/nitrogen mixture to remove excess carbon. The resultant powder has a carbon content of 0.44 wt % (1.47 wt % as SIC), an oxygen content of 2.36 wt % (4.43 wt % as $SiO_2$) and a BET surface area of 6.8 $m^2/g$. The results, while not the same as those in Example 1, are believed to be within experimental error.

Place 10.8 g of the $Si_3N_4$ powder into a graphite crucible equipped with a ½ inch (1.3 cm) diameter graphite feed tube for feeding nitrogen gas through a porous distributor plate in the crucible's base. The crucible has a diameter of 2.25 in (5.7 cm) and a depth of 3 in (7.6 cm). Place the crucible and its contents in an inert atmosphere SiC tube furnace having a heated zone with a diameter of 3 in (7.6 cm) and a length of 30 in (76 cm). Heat the crucible and its contents to a reaction temperature of 1500° C. and maintain that temperature for 12 hours before analyzing the crucible contents (powder). Analysis of the powder shows a carbon content of 0.26 wt % (0.87 wt % as SiC) and an oxygen content of 1.08 wt % (2.03 wt % as $SiO_2$). The powder has a $Si_3N_4$ content of 97.1 wt %. X-ray diffraction (XRD) analysis shows that the $Si_3N_4$ is greater than 95 wt % alpha phase. The powder has a BET surface area of 5.2 $m^2/g$. SEM and TEM analysis suggest that the reduction in surface area from 6.8 $m^2/g$ to 5.2 $m^2/g$ is a result of reduced internal powder particle porosity. Another way of expressing reduced internal porosity is to say that the particles take on a more solid crystallite form.

EXAMPLES 24–31

Repeat Example 23, but vary the heat treatment temperature, the time at temperature or both as shown in Table VI. Table VI also shows the powder carbon, oxygen, SiC, $SiO_2$ and $Si_3N_4$ contents and powder surface area together with comparable information from Example 23.

TABLE VI

| Example # | Temp (°C.) | Time (hrs) | Oxygen (wt %) | $SiO_2$ (wt %) | Carbon (wt %) | SiC (wt %) | $Si_3N_4$ (wt %) | Surf Area ($m^2/g$) |
|---|---|---|---|---|---|---|---|---|
| 23 | 1500 | 12 | 1.08 | 2.03 | 0.26 | 0.87 | 97.1 | 5.2 |
| 24 | 1500 | 8 | 1.41 | 2.6 | 0.33 | 1.1 | 96.3 | 5.5 |
| 25 | 1500 | 4 | 1.47 | 2.8 | 0.36 | 1.2 | 96.0 | — |
| 26 | 1450 | 12 | 1.34 | 2.5 | 0.31 | 1.0 | 96.4 | 5.8 |
| 27 | 1450 | 8 | 1.40 | 2.6 | 0.32 | 1.1 | 96.3 | 6.0 |
| 28 | 1450 | 4 | 1.58 | 3.0 | 0.36 | 1.2 | 95.8 | 6.1 |
| 29 | 1400 | 12 | 1.54 | 2.9 | 0.32 | 1.1 | 96.0 | 6.4 |
| 30 | 1400 | 8 | 1.59 | 3.0 | 0.37 | 1.2 | 95.8 | 6.8 |
| 31 | 1400 | 4 | 1.79 | 3.4 | 0.41 | 1.4 | 95.2 | 6.9 |

— means not measured

The data presented in Table VI demonstrate that higher heat treatment times and temperatures lead to lower residual $SiO_2$ and SiC contents than lesser times and temperatures. The data also demonstrate the feasibility of preparing $Si_3N_4$ powders with residual SiC contents of <1 wt % and residual $SiO_2$ contents of 2 wt % or less. The data further demonstrate that an increase in heating time, heating temperature, or both leads to a decrease in powder surface area and internal porosity of the powder. Substitution of a BN crucible for the graphite crucible produces similar results.

EXAMPLES 32–37

Use three different grades (coarse, medium and fine) of high purity crystalline quartz as $SiO_2$ sources and acetylene carbon black as a carbon source to prepare three different precursor powder batches. The $SiO_2$ sources are shown in Table VII, wherein the fine grade is designated "A", the medium grade is designated "B", and coarse grade is designated "C". Grades A and B are prepared by jet milling Grade C as described hereinabove.

TABLE VII

| Property | A (Fine) | B (Medium) | C (Coarse) |
|---|---|---|---|
| Wt % $SiO_2$ | >99.8 | >99.8 | >99.8 |
| Surf Area ($m^2$/g) | 5.5 | 0.4 | 0.04 |
| Al (ppm) | <50 | <50 | <50 |
| Ca (ppm) | <10 | <10 | <10 |
| Fe (ppm) | <15 | <15 | <15 |
| K (ppm) | <5 | <5 | <5 |
| $d_{10}$ (μm) | 0.66 | 2.36 | 115.3 |
| $d_{50}$ (μm) | 2.40 | 10.17 | 197.9 |
| $d_{90}$ (μm) | 7.08 | 24.93 | 318.7 |

Prepare each precursor powder batch by placing 116.6 g of acetylene carbon black, 145.9 g of quartz (Table VII), and 15.9 g of melamine into a 6250 milliliter (ml) urethane lined milling jar half filled with $Si_3N_4$ milling media (5 mm average diameter). Place the jar on a roller mill and dry mill for 2 hours before separating the precursor batch from the milling media. Add 700 ml deionized water to a large flask containing a stir bar, and heat the water, with stirring, to a temperature of 80° C. Add 130 drops of an alkylphenoxy polyethoxy ethanol (commercially available as TRITON™ X-100 from Rohm and Haas Company) and 60 drops of a silicon foam suppressing compound (commercially available as ANTIFOAM™ B from Dow Corning Corporation) while continuing stirring. Add the precursor powder batch and continue stirring for 15 minutes. Return the milling media to the jar and, after cooling the contents of the flask to ambient temperature, add them to the jar and wet ball mill the contents for 3 hours. After milling is complete, remove the contents, place them in a quartz tray and place the tray into a convection oven to dry overnight (14 hours) at 135° C.

After cooling back to ambient temperature, place the contents of the tray into the ball mill (now dry) and add 21.6 g of wheat starch and 9.8 g of corn starch. Dry mill the contents for 1 hour before recovering the resultant mixture from the milling media. Place the resultant mixture into a mortar, add 120 g of deionized water and blend the mortar contents with a pestle to prepare an extrudable mixture. Convert the mixture to wet pellets having a diameter of 0.25 inch (0.6 cm) and a length of 0.5inch (1.3 cm) using an extruder and cutting the extrudate with a razor blade. Convert the wet pellets into calcined pellets as in Example 1.

Use the apparatus and procedure of Example 23, but reduce the time at reaction temperature from 12 hours to 5 hours and use a temperature of either 1470° C. or 1500° C. to convert 15.0 g of calcined pellets prepared from each precursor powder batch into a product. Remove excess carbon as in Example 1, but increase the temperature from 700° C. to 800° C. and reduce the time at temperature from 3 hours to 2 hours.

Analysis of each product provides results shown in Table VIII. XRD analysis shows the $Si_3N_4$ to be greater than 95% α-phase. The product of Example 32 has a SiC content of 1.7 wt %, a $SiO_2$ content of 18.2 wt % and a $Si_3N_4$ content of 80.1 wt %.

TABLE VIII

| Example # | $SiO_2$ Type | Rxn Temp (°C.) | Oxygen (wt %) | $SiO_2$ (wt %) | Carbon (wt %) | SiC (wt %) | $Si_3N_4$ (wt %) | S.A. ($m^2$/g) |
|---|---|---|---|---|---|---|---|---|
| 32 | A | 1470 | 9.7 | 18.2 | 0.51 | 1.7 | 80.1 | - - |
| 33 | A | 1500 | 3.2 | 6.0 | 0.61 | 2.0 | 92.0 | 10.9 |
| 34 | B | 1470 | 11.9 | 22.3 | 0.42 | 1.4 | 76.3 | - - |
| 35 | B | 1500 | 2.7 | 5.1 | 0.58 | 1.9 | 93.0 | 12.3 |
| 36 | C | 1470 | 14.8 | 27.8 | 0.42 | 1.4 | 70.8 | - - |
| 37 | C | 1500 | 6.1 | 11.4 | 0.53 | 1.8 | 86.8 | 10.7 |

- - means not measured

The data in Table VIII demonstrate that the high purity quartz used as a starting material should be of a fine grade, preferably with a S.A. >0.2 $m^2$/g and a mean particle size ($d_{50}$)<15 μm in order to obtain high levels of conversion (<3 wt % residual monatomic and low levels of nanophase SiC (<2 wt % SiC, <0.6 wt % C as SIC). If greater SiC contents are desired, higher temperatures should be used. If higher residual oxygen contents are desired, coarser grades of high purity quartz should be used.

EXAMPLES 38–41

Repeat the procedure of Examples 32–37, but add 29.2 g of a composite powder prepared as in Example 3 as a seed prior to the initial dry ball milling step. Table IX collects data for these examples. SEM/TEM analysis of the resultant powders shows the presence of fine (0.2 μm MND) α-$Si_3N_4$ crystallites without any protruding β-$Si_3N_4$ fibers and of less than 50 nm (MND) SiC crystallites. XRD shows that the $Si_3N_4$ is greater than 95% α-$Si_3N_4$. X-Ray fluorescence (XRF) analysis of the resultant powders shows that they contain less than 100 ppm Ca, less than 50 ppm Al, less than 50 ppm Fe, less than 20 ppm S, less than 10 ppm Cl, less than 10 ppm F and less than 10 ppm K.

TABLE IX

| Example # | $SiO_2$ Type | Rxn Temp (°C.) | Oxygen (wt %) | $SiO_2$ (wt %) | Carbon (wt %) | SiC (wt %) | $Si_3N_4$ (wt %) | S.A. ($m^2$/g) |
|---|---|---|---|---|---|---|---|---|
| 38 | A | 1470 | 1.6 | 3.0 | 0.52 | 1.7 | 95.3 | 8.0 |
| 39 | A | 1500 | 1.8 | 3.4 | 0.59 | 2.0 | 94.6 | 7.4 |
| 40 | B | 1470 | 2.2 | 4.1 | 0.48 | 1.6 | 94.3 | 8.2 |
| 41 | B | 1500 | 1.7 | 3.2 | 0.55 | 1.8 | 95.0 | 7.9 |

The data in Table IX demonstrate that a fine, high purity, substantially α-$Si_3N_4$ powder having no β-$Si_3N_4$ fibers protruding from α-$Si_3N_4$ crystallites, less than 2 wt % monatomic oxygen and less than 2 wt % nanophase SiC (less than 50 nm MND) can be synthesized from admixtures of high purity, fine carbon (such as acetylene carbon black), high purity, fine crystalline quartz and $Si_3N_4$ seed crystallites.

EXAMPLES 42–44

Use three different carbon sources and a high purity crystalline quartz having a $SiO_2$ content in excess of 99.8 wt %, a surface area of 1.9 m²/g, and impurity levels (Al, Ca, Fe and K) equal to or lower than those shown in Table VII to prepare precursor powder batches. The carbon sources are listed in Table X, wherein a large particle size material (commercially available from R. T. Vanderbilt as THERMAX™ Ultra Pure) is designated "A", acetylene carbon black (the same as in Example 1) is designated "B" and an intermediate particle size material (commercially available from Cabot Corporation as MONARCH™ 120) is designated "C". A mathematical symbol (<) is used as an abbreviation for less than in Table X and elsewhere. Other mathematical symbols such as (>) are also used herein.

TABLE X

| Property | Carbon A | Carbon B | Carbon C |
|---|---|---|---|
| Wt % C | 98.9 | 98.6 | 96.0 |
| Wt % O | 0.3 | 0.3 | 0.6 |
| DBP Absorption (cm³/100 g) | 33 | 250 | 25 |
| Al (ppm) | <10 | <10 | 32 |
| Ca (ppm) | <10 | <10 | 155 |
| Cl (ppm) | <10 | <10 | 65 |
| Fe (ppm) | 7 | 12 | 40 |
| Na (ppm) | <200 | <200 | 340 |
| S (ppm) | <10 | <10 | 1.67 wt % |
| Si (ppm) | 18 | <10 | 16 |
| Average Particle Size (μm) | 0.22 | 0.03 | 0.06 |
| Surface Area (m²/g) | 8 | 72 | 25 |

Prepare each precursor powder batch with a different carbon source using the component amounts and procedure outlined in Example 32. Convert the powder batches to product powder using the procedure of Example 32, but reduce the temperature to 1435° C. Analysis of each product provides results shown in Table XI. XRD analysis shows the $Si_3N_4$ to be greater than 95% alpha phase.

TABLE XI

| Sample # | Carbon Type | Oxygen (wt %) | $SiO_2$ (wt %) | Carbon (wt %) | SiC (wt %) | $Si_3N_4$ (wt %) | SiC MND (nm) | SiC Size Range (nm) |
|---|---|---|---|---|---|---|---|---|
| 41 | A | 4.2 | 7.9 | 1.8 | 6.0 | 86.1 | 90 | 70–150 |
| 43 | B | 3.1 | 5.8 | 1.1 | 3.7 | 90.5 | 50 | 30–100 |
| 44 | C | 2.1 | 3.9 | 4.4 | 14.7 | 81.4 | 80 | 30–100 |

The data in Table XI demonstrate that SiC size depends, to some extent, upon starting carbon particle size. The amount of SiC may be influenced by other factors, such as the level of impurities in carbon type C (Table X) or temperature (Table II).

EXAMPLE 45

(Rod-like $\beta$-$Si_3N_4$ Crystallites)

Prepare wet pellets as in Example 1 using 116.6 grams (g) of acetylene carbon black, 145.9 g of quartz (Grade B, Table VII), 29.2 g of $Si_3N_4$ having a $\beta$-phase content of 81.2 wt % (commercially available from Shin Etsu Chemical Company as $KSN_{80}SP$), 17.2 g of melamine, 24.0 g wheat starch, 10.3 g of corn starch and 200 g of deionized water. Place the wet pellets into a forced air convection oven and dry them overnight (14 hours) at 135° C. Place the dried pellets into a tube furnace with flowing nitrogen gas and heat for 5 hours at 330° C. to calcine the starches and melamine.

Convert 9.2 g of the calcined pellets into a powder using the procedure of Example 32 with a reaction temperature of 1500° C. and a time at that temperature of 5 hours. Analysis after removal of excess carbon shows a carbon content of 0.45 wt % (1.5 wt % as SIC), an oxygen content of 1.5 wt % (2.8 wt % as $SiO_2$) and a BET surface area of 12.1 m²/g. A mass balance indicates that the product has about 3.0 g of $Si_3N_4$ over the amount of seed $Si_3N_4$. Calculations based upon XRD peak area analysis shows that the product has an $\alpha$-$Si_3N_4$ content of 64.8 wt % and a corresponding $\beta$-$Si_3N_4$ content of 35.2 wt %.

EXAMPLE 46

(Rapid Heating.)

Place 10.3 g of the calcined pellets prepared in Example 45 into a feed tube maintained at room temperature (taken as 25° C.) and located above a high temperature graphite crucible that is maintained at a temperature of 1435° C. Gaseous nitrogen flows through a perforated distributor in the crucible's base at a rate of 6 slpm. Open a ball valve in the feed tube to add the room temperature pellets to the heated crucible from above. Maintain the crucible and its contents at the 1435° C. for 5 hours. Remove the pellets from the crucible and remove excess carbon as in Examples 32–37. The resulting powder has a carbon content of 0.88 wt % (2.9 wt % as SiC) and an oxygen content of 2.67 wt % (5.0 wt % as $SiO_2$), based on powder weight. XRD analysis shows the presence of both $\alpha$-$Si_3N_4$ and $\beta$-$Si_3N_4$ in amounts similar to those in Example 45.

Analysis of the powders of Examples 45 and 46 by SEM and TEM shows the presence of both $\alpha$-$Si_3N_4$ and $\beta$-$Si_3N_4$. Characterization of the powder of Example 45 reveals the presence of $\alpha$-$Si_3N_4$ and $\beta$-$Si_3N_4$ crystallites, the $\beta$-$Si_3N_4$ crystallites having a MND of about 0.045 μm and a mean aspect ratio of 5.4/1, the aspect ratio ranging between 1.5/1 and 9/1 (a length within a range of from 0.08 to 0.5 μm, with a mean of 0.24 μm). The $\alpha$-$Si_3N_4$ crystallites have a MND 0.17 μm, the MND ranging from about 0.03 to about 0.46 μm. Characterization of the powder of Example 46 reveals the presence of $\alpha$-$Si_3N_4$ and $\beta$-$Si_3N_4$ crystallites, the $\beta$-$Si_3N_4$ crystallites having a MND of about 0.036 μm and a mean aspect ratio of 7.6/1, the aspect ratio ranging between 3/1 and 21/1 (a length within a range of from 0.05 to 1.1 μm, with a mean of 0.27 μm). The $\alpha$-$Si_3N_4$ crystallites have a MND 0.12 μm, the MND ranging from about 0.05 to about 0.22 μm.

If a composite powder prepared as in Example 13 (y=0.26) and a composite powder prepared as in Example 45 with a y value of 0.26 are both sintered as in Example 16, the composite powder prepared as in Example 45 reaches a density of 97 percent of theoretical density in 3 hours whereas the composite powder prepared as in Example 13 requires nearly 9 hours to attain the same density. The composite powder containing both $\alpha$-$Si_3N_4$ and $\beta$-$Si_3N_4$ crystallites (the $\beta$-$Si_3N_4$ crystallites being rod-like) is therefore more sinterable than a composite powder lacking the rod-like $\beta$-$Si_3N_4$ crystallites.

If the seed is changed to that used in Example 1, the product has an $\alpha$-phase $Si_3N_4$ content in excess of 95 wt %. The $\beta$-phase $Si_3N_4$ in such a product contains no rod-like crystallites. Changing the seed to a blend of 75 wt % of the seed used in Example 1 and 25 wt % of the seed used in Examples 45 and 46, yields a product having an $\alpha$-phase $Si_3N_4$ content of 90.5 wt % and a $\beta$-phase $Si_3N_4$ that contains no rod-like crystallites. In addition, heating the seed used in Example 46 at 1500° C. for 5 hours fails to produce any rod-like crystallites.

The foregoing results demonstrate that using a high β-phase $Si_3N_4$ seed yields a product that differs from those obtained with a high α-phase $Si_3N_4$ seed or a seed that is a blend of the high β-phase $Si_3N_4$ seed and the α-phase $Si_3N_4$ seed. The blend effectively dilutes the β-phase $Si_3N_4$ content to a level of less than 75 wt %, based upon seed weight. The rod-like β-$Si_3N_4$ crystallites appear only when the seed has a βphase $Si_3N_4$ content in excess of 75 wt %, based upon seed weight. Nucleation of fine solid α-$Si_3N_4$ crystallites and formation of rod-like β-$Si_3N_4$ crystallites occur either with slow heating as in Example 45 or rapid heating as in Example 46.

EXAMPLE 47

(Rapid Heating)

Prepare calcined pellets as in Example 45, but use a quartz having >99.8 wt % $SiO_2$ with a mean particle size ($d_{50}$) of <10 μm and change the seed to a crystalline α-phase $Si_3N_4$ powder (UBE Industries Ltd., as SN E-3). The quartz particle size is obtained in the same manner as silicas A and B in Table VII. The calcined pellets contain carbon at a level of 100% excess over that required to carbothermally reduce the $SiO_2$. The pellets contain sufficient $Si_3N_4$ to provide a seed/$SiO_2$ ratio of 0.2/1.

Convert 10.7 g of the calcined pellets using the apparatus and procedure of example 46, but reduce the excess carbon removal temperature to 700° C. It is estimated that external pellet surfaces are heated at a rate in excess of 100° C./second. Maintain the crucible and its contents at 1435° C. for 5 hours. The resulting powder has a carbon content of 0.65 wt % (2.17 wt % as SiC) and a monatomic oxygen content of 2.56 wt % (4.81 wt % as $SiO_2$), based on powder weight. XRD analysis shows the $Si_3N_4$ to be greater than 95% α-phase. Analysis by Field Emission Gun Scanning Electron Microscopy (FEG/SEM) shows the powder to be composed of $Si_3N_4$ crystallites having a MND of 0.32±0.1 μm. There appears to be a substantial number of fine α-phase $Si_3N_4$ crystallites that have a MND less than the seed particles present in the powder.

Duplicate this Example, but use the slower heating procedure of Example 1, to produce $Si_3N_4$ crystallites that are larger than those of this Example 47 and contain few, if any, new, fine crystallites.

EXAMPLES 48–50

(No Seed)

Using the component amounts, omitting the $Si_3N_4$ seed, and procedures of Examples 32–37, prepare precursor powder batches from three different $SiO_2$ sources and acetylene carbon black. Table XII shows the $SiO_2$ sources. High purity crystalline quartz (obtained in the same manner as A and B in Table VII) is designated "A"; low purity crystalline quartz is designated "B"; and high purity amorphous quartz is designated "C".

TABLE XII

| Property | Silica A | Silica B | Silica C |
|---|---|---|---|
| Wt % $SiO_2$ | >99.8 | 99.3 | >99.8 |
| Surf Area ($m^2$/g) | 1.9 | 2.2 | 204 |
| Al (ppm) | 18 | 640 | <2 |
| Ca (ppm) | <2 | 290 | <2 |
| Fe (ppm) | <2 | 360 | <2 |
| K (ppm) | <1 | 360 | <1 |
| P (ppm) | <2 | 23 | <3 |

TABLE XII-continued

| Property | Silica A | Silica B | Silica C |
|---|---|---|---|
| Ti (ppm) | <2 | 79 | <2 |

Convert 10.4 g of each precursor powder batch into a product using the procedure and conditions of Example 42–44. Analysis of each product provides results shown in Table XIII. XRD analysis shows the $Si_3N_4$ to be greater than 95% α-phase.

TABLE XIII

| Sample # | $SiO_2$ Type | Oxygen (wt %) | $SiO_2$ (wt %) | Carbon (wt %) | SiC (wt %) | $Si_3N_4$ (wt %) | Protruding β-$Si_3N_4$ Fibers Present |
|---|---|---|---|---|---|---|---|
| 48 | A | 3.1 | 5.8 | 1.1 | 3.7 | 90.5 | Trace |
| 49 | B | 3.5 | 6.6 | 0.6 | 2.0 | 91.4 | Yes |
| 50 | C | 3.5 | 6.6 | 1.4 | 4.7 | 89.3 | Yes |

The data in Table XIII demonstrate that the presence of β-$Si_3N_4$ fibers or whiskers protruding from α-$Si_3N_4$ crystallites depends upon crystallinity, purity and particle size of starting $SiO_2$ used to prepare the $Si_3N_4$ product. Only trace amounts of β-$Si_3N_4$ fibers result when using high purity, medium particle size crystalline $SiO_2$ whereas much larger, readily discernible amounts result when using either crystalline $SiO_2$ of lower purity or amorphous $SiO_2$ as a starting material. Similar results are expected with other compositions that are disclosed herein, including those with a seed material such as $Si_3N_4$.

EXAMPLE 51

Repeat Example 45, but change the seed to that used in Example 47, to prepare a product powder having a carbon content of 0.72 wt % (2.4 wt % as SiC) and an oxygen content of 1.38 wt % (2.6 wt % as $SiO_2$). XRD analysis shows the $Si_3N_4$ to be greater than 95% alpha phase. TEM/SEM analysis of the product indicates an α-$Si_3N_4$ crystallite MND of 0.68 μm.

Examples 51 and 52 demonstrate that α-$Si_3N_4$ seed MND strongly influences product α-$Si_3N_4$ crystallite MND. The smaller starting material MND in Example 52 leads to a product MND that is smaller than that of Example 51. The examples suggest that a seed α-$Si_3N_4$ crystallite MND of less than 0.15 μm favors synthesis of high purity (low metals and <2 wt % monatomic oxygen) α-$Si_3N_4$ powder with a crystallite MND of <0.3 μm.

EXAMPLES 53–58

Repeat Example 52, but vary the amount of α-$Si_3N_4$ seed from no seed in Example 53 to an amount sufficient to provide a seed/$SiO_2$ ratio in the starting material of 0.6:1 in Example 58. Table XIV shows the seed/$SiO_2$ ratio and the product α-$Si_3N_4$ crystallite MND. Table XIV includes comparable data from Example 52.

TABLE XIV

| Example Number | Seed/SiO Ratio | Product α-$Si_3N_4$ MND (μm) |
| --- | --- | --- |
| 53 | 0.0 | 0.72 ± 0.21 |
| 54 | 0.05 | 0.45 ± 0.13 |
| 55 | 0.1 | 0.41 ± 0.09 |
| 52 | 0.2 | 0.25 ± 0.07 |
| 56 | 0.3 | 0.18 ± 0.06 |
| 57 | 0.4 | 0.20 ± 0.07 |
| 58 | 0.6 | 0.19 ± 0.07 |

The data in Table XIV suggest that product α-$Si_3N_4$ crystallite MND can be controlled by the addition of seed α-$Si_3N_4$. High seed/$SiO_2$ ratios spread growth out over more crystallites than are available with low seed/$SiO_2$ ratios and lead to smaller product crystallite MND's than those resulting from low seed/$SiO_2$ ratios or no seed. The data also suggest that a seed/$SiO_2$ ratio of greater than about 0.15 promotes products having an α-$Si_3N_4$ crystallite MND of <about 0.3 μm, especially when combined with a seed α-$Si_3N_4$ crystallite MND of < about 0.2 μm. Although the latter products may be preferred for many applications, the products that result when no seed is used or the seed/$SiO_2$ ratio is very low (<0.15) are also suitable for use in some applications.

EXAMPLES 59–64

Prepare six batches of calcined pellets using the procedure and component amounts of Examples 32–37 and two different high purity carbon sources (Carbon A and Carbon C from Table X) and two different high purity $SiO_2$ sources (Silica A and Silica C from Table XII), both with and without the same $Si_3N_4$ seed as in Example 1. Use the same apparatus and procedure as in Examples 32–37, but reduce the temperature to 1435° C., to convert 10.4 g of each batch of calcined pellets into a product powder. Table XV identifies the carbon and $SiO_2$ sources, states whether or not the precursor powder batch contains a seed, and specifies the crystallite MND for both $Si_3N_4$ and SiC.

TABLE XV

| Example # | Carbon Type | Silica Type | Seed Present | $Si_3N_4$ MND (μm) | SiC MND (nm) |
| --- | --- | --- | --- | --- | --- |
| 59 | A | A | No | 0.5 | 90 |
| 60 | A | A | Yes | 0.2 | 80 |
| 61 | B | A | No | 0.7 | 50 |
| 62 | B | A | Yes | 0.2 | 40 |
| 63 | B | C | No | 1.2 | 35 |
| 64 | B | C | Yes | 0.4 | 50 |

Analysis of Example 61 shows a carbon content of 1.1 wt % (3.7 wt % as SiC) and an oxygen content of 3.1 wt % (5.8 wt % as $Si_{O2}$). XRD analysis shows the $Si_3N_4$ to be greater than 95% alpha phase. SEM/TEM analysis of the product shows that the $Si_3N_4$ crystallites fall within a size range of 0.4 to 1.1 μm with a crystallite MND of about 0.7±0.2 μm. The SiC crystallites are within a range of 30 to 100 nm with a MND of about 50 nm.

Analysis of Example 62, which differs from Example 61 by containing seed $Si_3N_4$, reveals a carbon content of 0.5 wt % (1.7 wt % as SIC), an oxygen content of 2.0 wt % (3.8 wt % as $SiO_2$). The $Si_3N_4$ crystallite size falls within a range of 0.1 to 0.5 μm with a crystallite MND of about 0.2±0.1 μm. The SiC crystallites are within a range of 20 to 90 nm with a crystallite MND of about 40 nm.

The data in Table XV demonstrate that use of a moderate surface area crystalline quartz as the $SiO_2$ source, acetylene black as the carbon source and a seed in the precursor assures synthesis of a fine composite powder wherein the $Si_3N_4$ crystallite MND is about 0.2 μm and the SiC crystallite MND is about 50 nm. In the absence of a seed, as in Example 61, product crystallite size tends to be larger than when seed is present (Example 62). Similarly, a larger starting carbon leads to comparatively larger SiC crystallites. Although a fine product crystallite size is desirable for many applications, products with comparatively large crystallite size are also useful for some applications.

If high purity amorphous $SiO_2$ (Silica C) is substituted for high purity crystalline $SiO_2$ (Silica A), it should promote $Si_3N_4$ growth. It should also result in larger $Si_3N_4$ crystallites in the product.

EXAMPLES 65–67

Prepare six batches of calcined pellets using the procedure and component amounts of Examples 59–64, the carbon sources of Table X, and Silica A from Table XII. Use the apparatus and procedure of Examples 59–64 to convert 10.5 g of each batch of calcined pellets into a product powder. Table XVI identifies the carbon (C) source, and provides product powder carbon and oxygen contents, with equivalent SiC and $SiO_2$ contents. XRD analysis shows the $Si_3N_4$ to be greater than 95% α-phase. SEM/TEM analysis of the $Si_3N_4$ crystallites reveals micropores of a size approximating that of the carbon source.

TABLE XVI

| Example # | C Source | Average C Particle Size (μm) | Carbon (wt %) | Oxygen (wt %) | SiC (wt %) | $SiO_2$ (wt %) | $Si_3N_4$ Micropore Size (μm) |
| --- | --- | --- | --- | --- | --- | --- | --- |
| 65 | A | 0.22 | 4.4 | 2.1 | 14.7 | 3.9 | 0.25 |
| 66 | B | 0.03 | 1.1 | 3.1 | 3.7 | 5.8 | 0.03 |
| 67 | C | 0.06 | 1.8 | 4.2 | 6.0 | 7.9 | 0.06 |

The results in Table XVI demonstrate that micropore size depends upon size of the carbon source. In other words, the largest micropores result from using the largest carbon source (Source A), while the finest micropores result from using the smallest carbon source (Source B). If precursors contain similar mass amounts of carbon, fine carbon crystallites should lead to $Si_3N_4$ crystallites with more pores than result from use of larger (coarser) carbon crystallites.

EXAMPLE 68

Repeat Example 47 using 10.6 g of calcined pellets prepared from a combination of 302 grams (g) of acetylene carbon black, 378 g of high purity quartz, 40 g of melamine, 56 g of wheat starch, 24 g of corn starch and 520 g of deionized water. All starting materials are the same as those used in Example 1. The resulting powder has a carbon content Of 0.8 wt % (2.7 wt % as SiC) and an oxygen content of 2.4 wt % (4.5 wt % as $SiO_2$), based on powder weight. XRD analysis shows the $Si_3N_4$ to be greater than 95% α-phase. A TEM photomicrograph shows the powder contains nanophase SiC having a MND of about 50 nm. The powder has a BET surface area of 11.8 $m^2/g$.

EXAMPLE 69

Repeat Example 6, but preheat the crucible to a temperature of 1500° C. and maintain that temperature for a period of 10 minutes before reducing the temperature to that of Example 68 for a period of 7 hours. The resultant powder has a carbon content of 4.7 wt % (15.7 wt % as SiC) and an oxygen content of 2.0 wt % (3.8 wt % as $SiO_2$), based on powder weight. XRD analysis shows the presence of SiC. TEM shows the presence of fine SiC crystallites dispersed in the $Si_3N_4$. The powder has a BET surface area of 12.9 $m^2/g$.

EXAMPLES 70–73

Repeat Example 69, but vary the initial preheat temperature and time at that temperature as shown in Table XVII. Table XVII also shows carbon and oxygen contents of the powder, equivalent weight percentages of SiC and $SiO_2$, $Si_3N_4$ content and powder S.A. and includes comparable data for Examples 68 and 69.

TABLE XVII

| Example # | Pre-heat Time (min) | Pre-heat Temp (°C.) | Oxygen (wt %) | $SiO_2$ (wt %) | Carbon (wt %) | SiC (wt %) | $Si_3N_4$ (wt %) | Powder S.A. ($m^2/g$) |
|---|---|---|---|---|---|---|---|---|
| 68 | 0 | 1435 | 2.4 | 4.5 | 0.8 | 2.7 | 92.8 | 11.8 |
| 69 | 10 | 1500 | 2.0 | 3.8 | 4.7 | 15.7 | 80.5 | 12.9 |
| 70 | 5 | 1525 | 3.1 | 5.8 | 6.8 | 22.7 | 71.5 | 12.9 |
| 71 | 15 | 1525 | 4.5 | 8.4 | 7.1 | 23.7 | 67.9 | 12.2 |
| 72 | 5 | 1475 | 2.6 | 4.9 | 1.6 | 5.3 | 89.8 | 12.3 |
| 73 | 15 | 1475 | 2.1 | 3.9 | 3.2 | 10.7 | 85.4 | 12.2 |

A comparison of Example 68 with Examples 69–73 shows the elevated initial temperatures of Examples 69–71 promote the formation of SiC. Examples 72 and 73 show that preheating temperatures below 1500° C.? e.g. 1475° C., also yield levels of SiC that exceed those attained in the absence of preheating. Lower preheating temperatures should provide similar results if preheating times are increased to compensate for slower rates of SiC production. The SiC formed at the initial high temperature should serve as a seed or catalyst for the subsequent carbothermal synthesis of $\alpha$-$Si_3N_4$.

EXAMPLES 74–83

(Varying Amounts of Seed and Excess Carbon Content)

Use the procedure of Example 47 to prepare five different precursor powder batches with varying amounts, all of which are shown in Table XVIII, of acetylene carbon black, high purity quartz (>99.8 wt % $SiO_2$ with a mean particle size ($d_{50}$) of 5.1 μm), and a crystalline $\alpha$-phase $Si_3N_4$ powder (prepared as in Example 2 with a mean particle size ($d_{50}$) of 0.86 μm and a BET surface area of 7.46 $m^2/g$), together with 28.0 g wheat starch, 12.0 g corn starch and 20.0 g melamine. Convert each powder batch to calcined pellets as in Example 47, but increase the deionized water to 300 g. Table XVIII also shows % excess carbon and ratio of seed/$SiO_2$ ratio in each batch of calcined pellets.

TABLE XVIII

| Component or Property | Precursor Number | | | | |
|---|---|---|---|---|---|
| | 1 | 2 | 3 | 4 | 5 |
| Carbon (g) | 113.2 | 113.2 | 113.2 | 154.4 | 78.4 |
| Silica (g) | 141.6 | 113.3 | 188.8 | 154.5 | 130.7 |
| $Si_3N_4$ seed (g) | 85.0 | 113.3 | 37.8 | 30.9 | 130.7 |
| % Excess Carbon | 100 | 150 | 50 | 150 | 50 |
| Seed/$SiO_2$ Ratio | 0.6:1 | 1.0:1 | 0.2:1 | 0.2:1 | 1.0:1 |

Use the procedure of Example 47 and a temperature/time combination of either 1435° C. for 5 hours or 1400° C. for 7 hours to convert a 10.3 g portion of each batch of calcined pellets to a product. Table XIX presents data relating to each example. The powder of Example 74 has an equivalent SiC content of 2.84 wt % and an equivalent $SiO_2$ content of 2.78 wt %. Equivalents for the other examples are readily determined without undue experimentation. XRD analysis shows the $Si_3N_4$ to be greater than 95% $\alpha$-phase.

TABLE XIX

| Example # | Precursor # | Excess C (%) | Seed/$SiO_2$ Ratio | Temp (°C.) | Residual C (wt %) | Residual O (wt %) | Powder Surf Area ($m^2/g$) |
|---|---|---|---|---|---|---|---|
| 74 | 1 | 100 | 0.6:1 | 1435 | 0.85 | 1.48 | 6.70 |
| 75 | 2 | 150 | 1.0:1 | 1435 | 0.63 | 1.28 | 6.20 |
| 76 | 3 | 50 | 0.2:1 | 1435 | 1.1 | 1.67 | 8.44 |
| 77 | 4 | 150 | 0.2:1 | 1435 | 0.61 | 2.89 | 9.85 |
| 78 | 5 | 50 | 1.0:1 | 1435 | 0.71 | 1.39 | 5.18 |
| 79 | 1 | 100 | 0.6:1 | 1400 | 0.57 | 1.58 | 6.54 |
| 80 | 2 | 150 | 1.0:1 | 1400 | 0.54 | 1.12 | 5.90 |
| 81 | 3 | 50 | 0.2:1 | 1400 | 0.88 | 1.61 | 8.40 |
| 82 | 4 | 150 | 0.2:1 | 1400 | 0.57 | 2.61 | 9.60 |
| 83 | 5 | 50 | 1.0:1 | 1400 | 0.65 | 1.23 | 5.19 |

The data in Table XIX demonstrate that, for a given $Si_3N_4$ seed, an increase in % excess carbon and a decrease in seed/$SiO_2$ ratio both yield a higher surface area $Si_3N_4$ product powder. Conversely, a decrease in % excess carbon and an increase in seed/$SiO_2$ ratio both yield a lower surface area $Si_3N_4$ product powder. As such, a desired product surface area can be attained via adjustment of the % excess carbon and seed/$SiO_2$ ratio. Similar results are expected with other $Si_3N_4$ seed materials and precursor compositions.

EXAMPLES 84–92

Use the procedure of Example 47 to prepare a primary batch powder from 302 g of acetylene carbon black, 378 g of the same quartz as in Example 1 and 40 g of melamine. Also as in Example 47, convert 220 g of the primary batch powder, 17.1 g wheat starch, 7.3 g corn starch and 173 g of deionized water into calcined pellets of a first precursor (P-1). Prepare a second precursor (P-2) by placing 250 g of the primary batch powder in the same milling jar used to prepare the primary batch powder together with the same size milling media and 15.8 g of Si metal (Elkem HQ SILGRAIN™, <10 μm average particle size) and dry ball milling for two hours before separating the resulting powder mixture from the milling media. Convert this powder mixture, 20.7 g wheat starch, 8.9 grams corn starch and 181 g deionized water into calcined pellets using the same procedure as in preparing P-1. The calcined pellets have a Si/$SiO_2$ ratio of 0.12. Prepare a third precursor (P-3) in the same manner as used for P-2, but increase the amount of Si metal to provide calcined pellets having a Si/SiO$_2$ ratio of 0.36.

Convert 10.2 g of P-1 pellets into a powder (Example 84) using the procedure of Example 47. The powder has a carbon content of 1.2 wt % (4.0 wt % as SiC) and an oxygen content of 2.3 wt % (4.3 wt % as SiO$_2$), based on powder weight. XRD analysis shows the Si$_3$N$_4$ to be greater than 95% α-phase. A SEM photomicrograph shows the powder contains crystallites having a diameter of about 1 μm.

Repeat Example 84, but vary the time at temperature or the precursor or both, as shown in Table XX, to prepare Examples 85-92. Table XX shows selected data for Examples 84-92.

TABLE XX

| Example # | Precursor | Time (hrs) | Oxygen (wt %) | SiO$_2$ (wt %) | Carbon (wt %) | SiC (wt %) | Si$_3$N$_4$ (wt %) |
| --- | --- | --- | --- | --- | --- | --- | --- |
| 84 | P-1 | 5 | 2.3 | 4.3 | 1.2 | 4.0 | 91.7 |
| 85 | P-1 | 6 | 2.1 | 3.9 | 0.9 | 3.0 | 93.1 |
| 86 | P-1 | 7 | 2.1 | 3.9 | 0.9 | 3.0 | 93.1 |
| 87 | P-2 | 5 | 2.9 | 5.4 | 7.3 | 24.4 | 70.2 |
| 88 | P-2 | 6 | 2.6 | 4.9 | 7.6 | 25.4 | 69.7 |
| 89 | P-2 | 7 | 2.7 | 5.1 | 9.0 | 30.0 | 64.9 |
| 90 | P-3 | 5 | 3.3 | 6.2 | 18.2 | 60.7 | 33.1 |
| 91 | P-3 | 6 | 3.4 | 6.4 | 17.6 | 58.7 | 34.9 |
| 92 | P-3 | 7 | 3.3 | 6.2 | 18.1 | 60.4 | 33.4 |

The data presented in Table XX demonstrate that the presence of Si metal influences the amount of SiC produced via carbothermal synthesis. The data also show that powders having a residual monatomic oxygen content of <4.0 wt % and a SiC content >0.5 wt % are readily produced in accordance with the present invention.

EXAMPLE 93

Prepare a pressureless sinterable composition using the powder of Example 3 and the following formulation, wherein all weight percentages are based upon composition weight and all components are in powder form: 95.6 wt % Si$_3$N$_4$; 2.31 wt % Y$_2$O$_3$; 1.17 wt % MBO; 0.24 wt % SiO$_2$; 0.5 wt % ZrO$_2$; and 0.18 wt % Ta$_2$O$_5$. The amount of SiO$_2$ reflects the added amount rather than the amount of SiO$_2$ contributed by the Si$_3$N$_4$ powder of Example 3. If that amount is included, the composition has a total SiO$_2$ content of 3.5 wt %. Attrit the composition components for one hour in ethanol using zirconia milling media to prepare an attrited mixture. Dry the attrited mixture using a rotary evaporator and separate the attrited mixture from the milling media using a 35 mesh (425 μm sieve opening) stainless steel sieve. Convert the mixture into test pieces by uniaxial pressing at about 2500 pounds per square inch (psi) (about 17 megapascals (MPa)) followed by isostatic pressing at about 40,000 psi (about 276 MPa).

Place the test pieces into a BN painted graphite crucible and surround them with a powder bed of the same composition as the test pieces. Sinter the pieces for 12 hours in a 4 inch (10 cm) ASTRO graphite furnace at 1750° C. under a one atmosphere (about 100 kilopascals (KPa)) flowing nitrogen atmosphere.

TEM analysis of the sintered pieces shows a SRS structure that contains residual SiC particles. The SiC particles are distributed throughout a SRS matrix and located in a glassy grain boundary phase at triple point junctions of Si$_3$N$_4$ grains (granular) and within Si$_3$N$_4$ grains (intragranular). Based upon the Si$_3$N$_4$ powder's carbon content, the sintered pieces contain about 1.4 wt % SiC reinforcement, based upon sintered piece weight.

Cut a section from a sintered piece and polish a surface to a mirror finish using, in succession, diamond pastes having an average particle size of 15 μm, 6 μm and 1 μm. Indent the polished surface with a 30.4 pound (lb) (about 14 kg) load using a diamond Vicker's indentor. From the indent, the Palmqvist toughness of the material is determined to be 44.2 kg/mm. If Si$_3$N$_4$ powder, such as that used as a seed in Example 1, is used in place of the composite powder of the present invention, the resultant sintered body has a lower Palmqvist toughness even with the same total SiO$_2$ content, additions of SiC powder or both. Similar results are expected with other powders produced as described herein as well as with other physical properties.

EXAMPLE 94

Prepare a series of SRS materials via hot pressing using a modification of the procedure described in Example 1 of U.S. Pat. No. 4,883,776 (column 12, line 31 through column 14, line 17). The relevant teachings of U.S. Pat. No. 4,883,776 are incorporated herein by reference. The modifications include: an applied pressure of 500 pounds per square inch gauge (psig) (3.4 MPa) rather than 1000 psig (6.9 MPa) while heating from ambient temperature to 1200° C. over a period of 60 minutes rather than 30 minutes; an increase to a temperature of 1850° C. over a period of 50 minutes rather than to 1825° C. over a period of 40 minutes; and a time at maximum temperature of one hour rather than 45 minutes. Each material is prepared according to the following formulation wherein all percentages are based upon composition weight: 85.78 wt % of a combination of Si$_3$N$_4$ and SiC powders; 5.84 wt % Y$_2$O$_3$; 3.22 wt % MgO; 0.32 wt % CaO; and 4.84 wt % total SiO$_2$ (added powder plus SiO$_2$ introduced by the Si$_3$N$_4$ powder). Prepare four powders as in Example 1, but vary the temperature and increase the time at temperature to 390 minutes. The resulting powders, their SiC contents and their designation are, respectively: 1450° C., 1.38 wt %, and A-1; 1470° C., 3.89 wt %, and A-2; 1480° C., 5.28 wt %, and A-3; and 1490° C., 19.78 wt %, and A-4. Physically admix SiC (0.18 μm average particle size by direct measurement from SEM photos, Ferro Corp.) with the Si$_3$N$_4$ powder used as a seed in Example 1 to provide respective SiC contents and designations of: 0.0 wt %, B-1; 3.50 wt %, B-2; and 7.00 wt %, B-3. Repeat the procedure used for B-1 through B-3, but change the Si$_3$N$_4$ powder to a direct nitrided powder (H. C. Starck Inc. as designation LC12N) to provide respective SiC contents and designations of: 0.0 wt %, C-1; 3.50 wt %, C-2; and 7.00 wt %, C-3. The SiC is the same as that used in Powder B. Powder D-1 is the same as Powder A-1 with an added 2.26 wt% of she same SiC powder as in Powder B-2. Table XXI shows the average room temperature (about 25° C.) strength, elevated temperature strength (1300° C.) and percent of room temperature strength retained at 1300° C. for several of the materials. Table XXII contrasts SiC content of several of the materials with average strain to failure, average fracture toughness values and average room temperature fracture strength. Table XXIII summarizes TEM results for two of the materials. The nitrogen content is determined by parallel electron energy loss spectroscopy (parallel EELS) with a GATAN Model 666 spectrometer fitted to either a VG HB601UX STEM operated at 100 kilovolts (kV) or an ABT EM-OO2B operated at 200 kV. R. F. Egerton, in *Electron Energy Loss Spectroscopy in the Electron Microscope* (1986), describes an approach wherein the nitrogen and carbon EELS signals for each particle are integrated and the nitrogen/carbon atomic ratio is calculated. The GATAN software follows this approach. Thus, the nitrogen values (2–10 wt %) reported herein reflect the use of this computational approach. The wt % nitrogen in SiC is then calculated directly from the atomic ratios.

TABLE XXI

| $Si_3N_4$ Powder | SiC Content (wt %) | Strength (Room Temp) (MPa) | Strength (1300° C.) (MPa) | % of Room Temp Strength Retained at 1300° C. |
|---|---|---|---|---|
| A-1 | 1.38 | 935 | 563 | 60 |
| A-2 | 3.89 | 832 | 565 | 68 |
| A-3 | 5.28 | 1045 | 505 | 48 |
| B-1 | 0.0 | 1005 | 505 | 50 |
| B-2 | 3.5 | 1128 | 563 | 50 |
| B-3 | 7.0 | 905 | 523 | 57 |
| C-1 | 0.0 | 835 | 308 | 37 |
| C-2 | 3.5 | 740 | 283 | 38 |
| C-3 | 7.0 | 795 | 261 | 33 |

TABLE XXII

| $Si_3N_4$ Powder | SiC Content (wt %) | % Strain at Failure | Fracture Toughness (MPa.m½) | Fracture Strength (MPa) |
|---|---|---|---|---|
| A-1 | 1.38 | 0.78 | 7.73 | 935 |
| A-2 | 3.89 | 0.75 | * | * |
| A-3 | 5.28 | 0.71 | 7.41 | 1045 |
| A-4 | 19.78 | 0.69 | 7.77 | 1090 |
| B-1 | 0.0 | * | 8.11 | 1050 |
| B-2 | 3.5 | 0.92 | 7.35 | 1125 |
| B-3 | 7.0 | 0.78 | 6.75 | 905 |
| C-1 | 0.0 | 1.34 | 7.43 | 835 |
| C-2 | 3.5 | 0.94 | 6.77 | 740 |
| C-3 | 7.0 | 0.82 | 6.02 | 795 |
| D-1 | 3.64 | * | 7.06 | * |

*means no sample prepared for this test

TABLE XXIII

|  | Powder A-2 | Powder B-2 |
|---|---|---|
| SiC Content (wt %) | 3.89 | 3.5 |
| Size of Granular/Triple Point SiC (nm) | 100–500 | 100–400 |
| Size of Intragranular SiC (nm) | 40–240 | 70–280 |
| Distribution of Triple Point SiC | Clustered | Isolated |
| Glass Phase O/Si ratio | 0.65:1 | 0.90:1 |
| Nitrogen in Intragranular SiC | Yes | No |

The data in Tables XXI through XXIII illustrate several points. First, as shown in Table XXI, SRS materials prepared with composite powders of the present invention have a greater retention of high temperature strength (MPa) at SiC contents of 3.89 wt % or 1.38 wt % than those prepared with physical mixtures of 3.5 wt % or 7.0 wt % submicrometer SiC powder and either diimide derived $Si_3N_4$ powders or direct nitrided $Si_3N_4$ powders. Second, Table XXII shows that SRS materials prepared with composite powders of the invention have greater creep resistance at a given SiC content than those prepared with physical mixtures of submicrometer SiC powder and either diimide derived $Si_3N_4$ powders or direct nitrided $Si_3N_4$ powders. Creep resistance is inversely proportional to strain at failure. A SiC addition of 7.0 wt % to a diimide derived $Si_3N_4$ powder is required to attain the same creep resistance as a composite powder having a SiC content of 1.38 wt %. Table XXII also shows that physical additions of SiC decrease fracture toughness and, to a lesser extent, room temperature strength of SRS materials. Table XXIII highlights microstructural differences between an SRS material prepared from a composite powder of the invention and an SRS material prepared by physically admixing SiC powder into a composition based upon a diimide derived $Si_3N_4$ powder. These microstructural differences are believed, at least in part, to account for the differences disclosed by reviewing Tables XXI through XXIII. An additional difference is that at least a portion of the intragranular SiC in the SRS material prepared with powder A-2 (Table XXIII) contains about 3.3 wt % residual nitrogen (as measured by parallel EELS) whereas the intragranular SiC in the SRS material prepared with powder B-2 (physically mixed SiC) does not. This residual nitrogen presumably comes from the SiC portion of the composite powders prepared as described herein. As such, it is expected in all SRS bodies prepared from composite powders of the present invention. Similar results are expected with other composite powders prepared as described herein.

EXAMPLE 95

Repeat Example 5, but change the reaction temperature from 1475° C. to 1500° C. The resulting powder has a carbon content of 1.59 wt % (5.3 wt % as SIC), based upon powder weight. TEM analysis shows that the carbon is present as nanosized SiC. Parallel EELS analysis shows that the SiC has a nitrogen content of 2.3 wt %, based upon SiC weight.

EXAMPLE 96

Repeat Example 95, but eliminate the $Si_3N_4$ powder used as a seed and decrease the reaction temperature from 1500° C. to 1485° C. The resulting powder has a carbon content of 1.1 wt % (3.7 wt % as SIC), based upon powder weight. TEM analysis shows that the carbon is present as nanosized SiC. Parallel EELS analysis shows that the SiC has a nitrogen content of 9.9 wt %, based upon SiC weight.

Examples 95 and 96 demonstrate that composite powders of the invention contain SiC and that the SiC contains nitrogen. Similar results are expected with the composite powders of the other examples as well as with other composite powders prepared as described herein. By way of contrast, parallel EELS analysis of commercially available silicon carbide powder reveals no detectable level of nitrogen even after the powder has been subjected to a three hour heat treatment at 700° C. in any one of air, nitrogen or a 50/50 (by volume) air/nitrogen mixture.

What is claimed is:

1. A silicon nitride-silicon carbide composite powder comprising a silicon nitride phase that is at least 90 percent by weight, based upon silicon nitride phase weight, α-silicon nitride and a silicon carbide phase that is in the form of particles having a mean number diameter within a range of from about 10 to about 700 nanometers, the silicon carbide phase having a nitrogen content, as determined by parallel electron energy loss spectroscopy, within a range of from about 2 to about 10 percent by weight of the silicon carbide portion, the silicon carbide phase being present in an amount within a range of from greater than 0 percent by weight to about 50 percent by weight, based upon composite powder weight, the composite powder having a BET surface area of from about 3 to about 15 m²/g.

2. The composite powder of claim 1 having a silicon nitride crystallite mean number diameter of less than 0.3 μm, a surface area than lies within a range of from about 8 to about 13 m²/g, and a mean number diameter for silicon carbide of less than 100 nanometers, less than 2 wt % residual oxygen as monatomic oxygen, and residual elemental impurities of less than 100 ppm calcium, less than 50 ppm iron, less than 200 ppm aluminum, less than 20 ppm sulfur, less than 50 ppm fluorine, less than 10 ppm potassium and less than 10 ppm chlorine and is substantially free of α-$Si_3N_4$ crystallites having β-$Si_3N_4$ fibers protruding therefrom.

3. The composite powder of claim 1, wherein the silicon carbide phase is in the form of particles having a bimodal distribution, the bimodal distribution having a first distribution peak located at a mean number diameter within a range of from about 10 to about 200 nanometers and a second distribution peak located at a mean number diameter within a range of from about 200 to about 700 nanometers.

4. A silicon nitride-silicon carbide composite powder having a silicon nitride phase and a silicon carbide phase, the silicon nitride phase having a phase purity of >10% β-$Si_3N_4$ and comprising rod shaped β-$Si_3N_4$ crystallites that have a mean number diameter of about 0.04 μm, the number diameter ranging from about 0.01 to about 0.10 μm, and a mean aspect ratio of from about 5/1 to about 8/1, ranging from about 1.5/1 to about 21/1 and α-$Si_3N_4$ crystallites that have a mean number diameter of from about 0.1 to about 0.2 μm, the number diameter ranging from about 0.03 to about 0.5 μm.

* * * * *